(12) United States Patent
Chu et al.

(10) Patent No.: US 11,297,646 B1
(45) Date of Patent: *Apr. 5, 2022

(54) METHODS AND APPARATUS FOR PROTECTING TRANSMISSIONS IN A WIRELESS COMMUNICATION NETWORK

(71) Applicant: NXP USA, Inc., Austin, TX (US)

(72) Inventors: Liwen Chu, San Ramon, CA (US); Lei Wang, San Diego, CA (US); Hongyuan Zhang, Fremont, CA (US); Jinjing Jiang, San Jose, CA (US); Yakun Sun, San Jose, CA (US); Hui-Ling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/694,023

(22) Filed: Nov. 25, 2019

Related U.S. Application Data

(63) Continuation of application No. 15/192,743, filed on Jun. 24, 2016, now Pat. No. 10,492,221.

(60) Provisional application No. 62/184,376, filed on Jun. 25, 2015.

(51) Int. Cl.
 *H04W 74/08* (2009.01)
(52) U.S. Cl.
 CPC ................ *H04W 74/0808* (2013.01)
(58) Field of Classification Search
 None
 See application file for complete search history.

(56) References Cited

U.S. PATENT DOCUMENTS

| | | | |
|---|---|---|---|
| 7,599,332 B2 | 10/2009 | Zelst et al. | |
| 7,742,390 B2 | 6/2010 | Mujtaba | |
| 8,068,455 B2 | 11/2011 | Utsunomiya et al. | |
| 8,155,138 B2 | 4/2012 | van Nee | |
| 8,289,869 B2 | 10/2012 | Sawai | |
| 8,363,578 B1 | 1/2013 | Ramamurthy et al. | |
| 8,526,351 B2 | 9/2013 | Fischer et al. | |
| 8,619,907 B2 | 12/2013 | Mujtaba et al. | |
| 8,670,399 B2 | 3/2014 | Liu et al. | |
| 8,724,720 B2 | 5/2014 | Srinivasa et al. | |

(Continued)

FOREIGN PATENT DOCUMENTS

WO  WO-2012/122119 A1  9/2012

OTHER PUBLICATIONS

U.S. Appl. No. 62/163,984 Kim (Year: 2015).*

(Continued)

*Primary Examiner* — Jeffrey M Rutkowski
*Assistant Examiner* — Basil Ma

(57) ABSTRACT

In generating a physical layer (PHY) data unit is for transmission in a shared communication medium during a transmit opportunity (TXOP), a wireless communication device generates a TXOP field to indicate a length of time remaining in the TXOP. The wireless communication device generates a physical layer (PHY) preamble of the PHY data unit to include a legacy signal field in a legacy portion of the PHY preamble and a non-legacy signal field in a non-legacy portion of the PHY preamble, the non-legacy signal field generated to include the TXOP field. The wireless communication device generates the PHY data unit to include the PHY preamble and a data portion, and transmits the PHY data unit in the shared communication medium.

16 Claims, 11 Drawing Sheets

(56) References Cited

U.S. PATENT DOCUMENTS

| | | | |
|---|---|---|---|
| 8,737,405 | B2 | 5/2014 | Liu et al. |
| 8,787,338 | B2 | 7/2014 | Liu et al. |
| 8,787,385 | B2 | 7/2014 | Liu et al. |
| 8,811,203 | B1 | 8/2014 | Liu et al. |
| 8,867,653 | B2 | 10/2014 | Zhang et al. |
| 8,871,350 | B2 | 10/2014 | Nakayama |
| 8,886,755 | B1 | 11/2014 | Liu et al. |
| 8,923,118 | B1 | 12/2014 | Liu et al. |
| 8,948,283 | B2 | 2/2015 | Zhang |
| 8,971,350 | B1 | 3/2015 | Liu |
| 8,982,889 | B2 | 3/2015 | Zhang |
| 9,197,298 | B2 | 11/2015 | Kim et al. |
| 9,215,055 | B2 | 12/2015 | Chu et al. |
| 9,226,294 | B1 | 12/2015 | Liu et al. |
| 9,258,178 | B2 | 2/2016 | Zhang |
| 9,655,002 | B2 | 5/2017 | Zhang et al. |
| 10,201,009 | B1 | 2/2019 | Wang et al. |
| 10,285,202 | B2 | 5/2019 | Chu et al. |
| 10,492,221 | B1 | 11/2019 | Chu et al. |
| 2009/0196163 | A1 | 8/2009 | Du |
| 2013/0229996 | A1 | 9/2013 | Wang et al. |
| 2015/0131517 | A1 | 5/2015 | Chu et al. |
| 2015/0146653 | A1 | 5/2015 | Zhang et al. |
| 2015/0146654 | A1 | 5/2015 | Chu et al. |
| 2015/0327276 | A1* | 11/2015 | Rebeiz ............. H04W 72/1289 370/329 |
| 2016/0374087 | A1 | 12/2016 | Liu et al. |
| 2016/0374093 | A1* | 12/2016 | Asterjadhi ........ H04W 72/0486 |
| 2017/0105143 | A1 | 4/2017 | Seok |
| 2017/0201956 | A1* | 7/2017 | Huang ............. H04W 56/0005 |
| 2017/0295560 | A1* | 10/2017 | Kim ...................... H04L 5/0055 |
| 2019/0208484 | A1* | 7/2019 | Huang ............. H04W 56/0005 |

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE P802.11n™ D3.00, "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).

IEEE Std. 802.11n™ "IEEE Standard for Information Technology-Telecommunications and information exchange between systems-Local and metropolitan area networks-Specific requirements, Part 11: Wireless LAN Medium Access Control (MAC) and Physical Layer (PHY) Specifications: Amendments: Enhancements for Higher Throughput," *The Institute of Electrical and Electronics Engineers, Inc.*, pp. 1-535 (Oct. 2009).

IEEE Std 802.11ac/D7.0 "Draft STANDARD for Information Technology-Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

Cariou et al., "Multi-channel Transmissions," Doc. No. IEEE 802.11-09/1022r0, *The Institute of Electrical and Electronics Engineers, Inc.*, pp. 1-13 (Sep. 2009).

Chen, "Home Network Basis: Transmission Environments and Wired/Wireless Protocols," Prentice Hall, pp. 1-26 (Jul. 2006).

Chun et al., "Legacy Support on HEW frame structure," doc: IEEE 11-13/1057r0, *The Institute of Electrical and Electronics Engineers, Inc.*, pp. 1-8 (Sep. 2013).

Hiertz et al., "The IEEE 802.11 Universe," IEEE Communications Magazine, pp. 62-70, (Jan. 2010).

Liu et al., "VHT BSS Channel Selection," *Institute of Electrical and Electronics Engineers, Inc.*, doc. No. IEEE 802.11-11/1433r0, pp. 1-10 (Nov. 2011).

Mujtaba, "IEEE P802.11—Wireless LANs, TGn Sync Proposal Technical Specification," *The Institute of Electrical and Electronics Engineers, Inc.*, doc.: IEEE 802.11—04/0889r6, pp. 1-131 (May 2005).

Noh et al., "Channel Selection and Management for 11ac," Doc. No. IEEE 802.11-10/0593r1, *The Institute of Electrical and Electronics Engineers, Inc.*, pp. 1-21 (May 20, 2010).

Park, "IEEE 802.11 ac: Dynamic Bandwidth Channel Access," 2011 IEEE Int'l Conf. on Communications (ICC), pp. 1-5 (Jun. 2011).

Pedersen et al., "Carrier Aggregation for LTE-Advanced: Functionality and Performance Aspects," IEEE Communications Magazine, vol. 49, No. 6, pp. 89-95, (Jun. 1, 2011).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Redieteab et al., "Cross-Layer Multichannel Aggregation for Future WLAN Systems," 2010 IEEE Int'l Conf. on Communication Systems (ICCS), pp. 740-756 (Nov. 2010).

Seok et al., "HEW PPDU Format for Supporting MIMO-OFDMA," IEEE 802.11-14/1210r0, 16 pages, (Sep. 14, 2014).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Van Nee et al. "The 802.11n MIMO-OFDM Standard for Wireless LAN and Beyond," Wireless Personal Communications, vol. 37, pp. 445-453 (Jun. 2006).

Wannstrom, "Carrier Aggregation explained," pp. 1-6 (May 2012).

Yuan et al., "Carrier Aggregation for LTE-Advanced Mobile Communication Systems," IEEE *Communications Magazine*, pp. 88-93 (Feb. 2010).

IEEE Std 802.11af/D1.05 "Draft Standard for Information Technology-Telecommunications and information exchange between systems-Local and metropolitan area networks-Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

IEEE Std 802.11ah™/D1.0 "Draft STANDARD for Information Technology-Telecommunications and information exchange between systems Local and metropolitan area networks-Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-394 (Oct. 2013).

IEEE P802.11ah™/D1.3 "Draft STANDARD for Information Technology-Telecommunications and information exchange between systems Local and metropolitan area networks-Specific requirements, Part 11: Wireless LAN Medium Access Control (MAC) and Physical Layer (PHY) specifications: Amendment 6: Sub 1 GHz License Exempt Operation," *The Institute of Electrical and Electronics Engineers, Inc.*, pp. 1-466 (Apr. 2014).

IEEE P802.11ah™/D5.0 "Draft STANDARD for Information Technology-Telecommunications and information exchange between systems Local and metropolitan area networks-Specific requirements, Part 11: Wireless LAN Medium Access Control (MAC) and

(56) References Cited

OTHER PUBLICATIONS

Physical Layer (PHY) Specifications: Amendment 2: Sub 1 GHz License Exempt Operation," *The Institute of Electrical and Electronics Engineers, Inc.*, pp. 1-632 (Mar. 2015).

IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).

IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).

De Vegt, "Potential Compromise for 802.11 ah Use Case Document," Institute of Electrical and Electronics Engineers, doc. No. IEEE 802.11-11/0457r0, pp. 1-27 (Mar. 2011).

Lee et al., "TGaf PHY proposal," *The Institute of Electrical and Electronics Engineers*, doc. No. IEEE 802.11-12/0809r5, pp. 1-43 (Jul. 10, 2012).

Park et al., "Low Power Capability Support for 802.11ah," doc. No. IEEE 802.11-11/0060r1, *The Institute for Electrical and Electronics Engineers*, 7 pages (Jan. 17, 2011).

Park, "Proposed Specification Framework for TGah D9.x", The Institute of Electrical and Electronics Engineers, doc. No. IEEE 802.11-yy/xxxxr0, pp. 1-30 (Jul. 2012).

Park, "Proposed Specification Framework for TGah", *The Institute of Electrical and Electronics Engineers*, doc. No. IEEE 802.11-yy/xxxxr05, pp. 1-12 (Jan. 2012).

Park, "Proposed Specification Framework for TGah", *The Institute of Electrical and Electronics Engineers*, doc. No. IEEE 802.11-11/1137r11, pp. 1-36 (Sep. 2012).

Park, "Proposed Specification Framework for TGah", *The Institute of Electrical and Electronics Engineers*, doc. No. IEEE 802.11-11/1137r6, pp. 1-13 (Mar. 2012).

Park, "Specification Framework for TGah," *The Institute of Electrical and Electronics Engineers*, doc. No. IEEE 802.11-11/1137r13, pp. 1-58 (Jan. 14, 2013).

Shao, "Channel Selection for 802.11ah," doc.: IEEE 802.11-12/0816r0, pp. 1-11 (Jul. 2012).

Taghavi et al., "Introductory Submission for TGah", doc. No. IEEE 802.11-11/0062r0, *Institute for Electrical and Electronics Engineers*, pp. 1-5 (Jan. 14, 2011).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

Vermani et al. "Preamble Format for 1 MHz," *The Institute of Electrical and Electronics Engineers*, doc. No. IEEE 802.11-11/1482r2, pp. 1-30 (Nov. 2011).

Vermani et al. "Spec Framework Text for PHY Numerology," *The Institute of Electrical and Electronics Engineers*, doc. No. IEEE 802.11-11/1311r0, pp. 1-5 (Sep. 2011).

Yu et al., "Coverage extension for IEEE802.11ah," *The Institute of Electrical and Electronics Engineers*, doc. No. IEEE 802.11-11/0035r1, pp. 1-10 (Jan. 2011).

Zhang et al., "11ah Data Transmission Flow," *The Institute of Electrical and Electronics Engineers*, doc. No. IEEE 802.11-11/1484r1, pp. 1-15 (Nov. 2011).

Zhang et al., "1 MHz Waveform in Wider BW ", *The Institute of Electrical and Electronics Engineers*, doc. No. IEEE 802.11-12/0309r1, pp. 1-10 (Mar. 2012).

Zhang et al., "Beamforming Feedback for Single Stream," *The Institute of Electrical and Electronics Engineers*, doc. No. IEEE 802.11-12/1312r0, pp. 1-22 (Nov. 12, 2012).

\* cited by examiner

METHODS AND APPARATUS FOR PROTECTING TRANSMISSIONS IN A WIRELESS COMMUNICATION NETWORK

CROSS-REFERENCE TO RELATED APPLICATION

This application is a continuation of U.S. patent application Ser. No. 15/192,743, now U.S. Pat. No. 10,492,221, entitled "Methods and Apparatus for Protecting Transmissions in a Wireless Communication Network," filed on Jun. 24, 2016, which claims the benefit of U.S. Provisional Patent Application No. 62/184,376, entitled "NAV and EIFS in HE STA/AP," filed Jun. 25, 2015. Both of the applications referenced above are incorporated by reference herein in their entireties.

FIELD OF THE DISCLOSURE

The present disclosure relates generally to communication networks and, more particularly, to wireless local area networks that utilize orthogonal frequency division multiplexing (OFDM).

BACKGROUND

The Institute for Electrical and Electronics Engineers (IEEE) 802.11 family of Standards (generally "802.11") has gone through several iterations over the last decade. In some of the 802.11 standards, such as 802.11ah and beyond, the identity of the Basic Service Set (BSS) (e.g., as managed by an access point (AP) of the BSS) is indicated in a Physical Layer Convergence Procedure (PLCP) Protocol Data Unit (PPDU) by a set of bits that described the "color" of the BSS. The color of a BSS corresponds to an identifier (ID) of the BSS that is shorter than a BSS identifier (BSSID) defined by 802.11. The BSS color may be contained in the Physical Layer (PHY) Signal (SIG) field in a PHY header of a PPDU, whereas the BSSID is typically included in a media access control (MAC) portion of PPDUs. A device (e.g., an AP or client) in a BSS can determine whether a PPDU is from the BSS to which the device belongs (the "same-BSS") or some other BSS (e.g., an overlapping BSS (OBSS)) by decoding the SIG field and interpreting BSS color bits included therein.

SUMMARY

In an embodiment, a method for generating a physical layer (PHY) data unit for transmission in a shared communication medium during a transmit opportunity (TXOP) includes: generating, at a wireless communication device, a TXOP field to be included in the PHY data unit, the TXOP field generated to indicate a length of time remaining in the TXOP; generating, at the wireless communication device, a PHY preamble of the PHY data unit, the PHY preamble generated to include i) a legacy signal field in a legacy portion of the PHY preamble and ii) a non-legacy signal field in a non-legacy portion of the PHY preamble, wherein generating the PHY preamble includes generating the non-legacy signal field to include the TXOP field; generating, at the wireless communication device, the PHY data unit to include the PHY preamble and a data portion; and transmitting, by the wireless communication device, the PHY data unit in the shared communication medium.

In another embodiment, a wireless network interface device implemented on one or more integrated circuits (ICs), wherein the wireless network interface device is configured to: generate a transmit opportunity (TXOP) field to be included in a PHY data unit for transmission in a shared communication medium during a TXOP of the wireless communication device, the TXOP field generated to indicate a length of time remaining in the TXOP; generate a PHY preamble of the PHY data unit, the PHY preamble generated to include i) a legacy signal field in a legacy portion of the PHY preamble and ii) a non-legacy signal field in a non-legacy portion of the PHY preamble, the wireless network interface device being configured to generate the non-legacy signal field to include the TXOP field; generate the PHY data unit to include the PHY preamble and a data portion; and transmit the PHY data unit in the shared communication medium.

In yet another embodiment, a method for operating in a shared communication medium during a transmit opportunity (TXOP) includes: receiving, at a wireless communication device, a physical layer (PHY) data unit, including receiving a PHY preamble of the PHY data unit, wherein the PHY preamble includes i) a legacy signal field in a legacy portion of the PHY preamble and ii) a non-legacy signal field in a non-legacy portion of the PHY preamble, the non-legacy signal field including a TXOP field; processing, at the wireless communication device, the TXOP field to determine a length of time remaining in the TXOP; setting, at the wireless communication device, a channel access counter based on the length of time remaining in the TXOP determined based on the TXOP field in the non-legacy signal field in the non-legacy portion of the PHY preamble of the PHY data unit; and performing, at the wireless communication device, a channel access procedure using the channel access counter set based on the length of time remaining in the TXOP to defer transmission, by the wireless communication device, in the shared communication medium for at least the length of time remaining in the TXOP.

In still another embodiment, a wireless communication device comprises a wireless network interface device implemented on one or more integrated circuits (ICs), wherein the wireless network interface device is configured to: receive a physical layer (PHY) data unit, including receiving a PHY preamble of the PHY data unit, wherein the PHY preamble includes i) a legacy signal field in a legacy portion of the PHY preamble and ii) a non-legacy signal field in a non-legacy portion of the PHY preamble, the non-legacy signal field including a TXOP field; process the TXOP field to determine a length of time remaining in the TXOP; set a channel access counter based on the determined length of time remaining in the TXOP determined based on the TXOP field in the non-legacy signal field in the non-legacy portion of the PHY preamble of the PHY data unit; and perform a channel access procedure using the channel access counter set based on the length of time remaining in the TXOP to defer transmission, by the wireless communication device, in the shared communication medium for at least the length of time remaining in the TXOP.

DETAILED DESCRIPTION

In order for communication device that is compliant with a first communication protocol (e.g., IEEE 802.11ax) to determine whether a given transmission, such a physical layer (PHY) protocol data unit (PPDU), corresponds to a same-BSS (also referred to herein as "intra-BSS" or "self-BSS") or to an OBSS (also referred to herein as "inter-BSS"), the device may obtain a BSS identifier, such as a BSS color, from the transmission and compare the BSS identifies to an identifier of the BSS to which the device belongs. If the BSS identifiers are the same, the device may conclude that the transmission corresponds to the same-BSS. On the other hand, if the BSS identifiers are different, then the device may conclude that the transmission corresponds to an OBSS. Alternatively, the device may compare a receiver address (RA) and/or a transmitter address (TA) obtained from transmission to an address of an access point associated with the BSS to which the device belongs. If the RA address or the TA address obtained from the transmission is the same as the address of the AP, then the device may conclude that the transmission corresponds to the same-BSS. On the other hand, if the RA address and the TA address obtained from the transmission are different from the address of the AP, then the device may conclude that the transmission corresponds to an OBSS.

Additionally, the device may obtain a duration value included the transmission. In an embodiment, the device utilizes the determination of whether the transmission corresponds to a same BSS or an OBSS, and the duration value obtained from the transmission, in determining whether and how to reset a value of a channel access counter (e.g., a network access vector (NAV) counter, or simply "NAV") maintained by the device.

In an embodiment, when the device sets or resets the channel access counter based on a duration indicated in a data unit, the device associates the channel access counter with the BSS corresponding to the data unit. For example, the device records a value of a BSS indicator included in the data unit as an association between the channel access counter and the BSS corresponding to the data unit, in an embodiment. When the device receives a subsequent data unit, the device compares a BSS indicated in the subsequent data unit with the BSS currently associated with the channel access counter of the device. For example, the device compares a value of a BSS indicator included in the subsequent data unit with the recorded value of the BSS indicator from the previous data unit, in an embodiment. In an embodiment, if the BSS indicated in the data unit is the same BSS as the BSS currently associated with the channel access counter of the device, the device resets the channel access counter based on a duration indicated in the data unit even if the duration indicated in the data unit is shorter than the current value of the channel access counter of the device.

Figure 1:
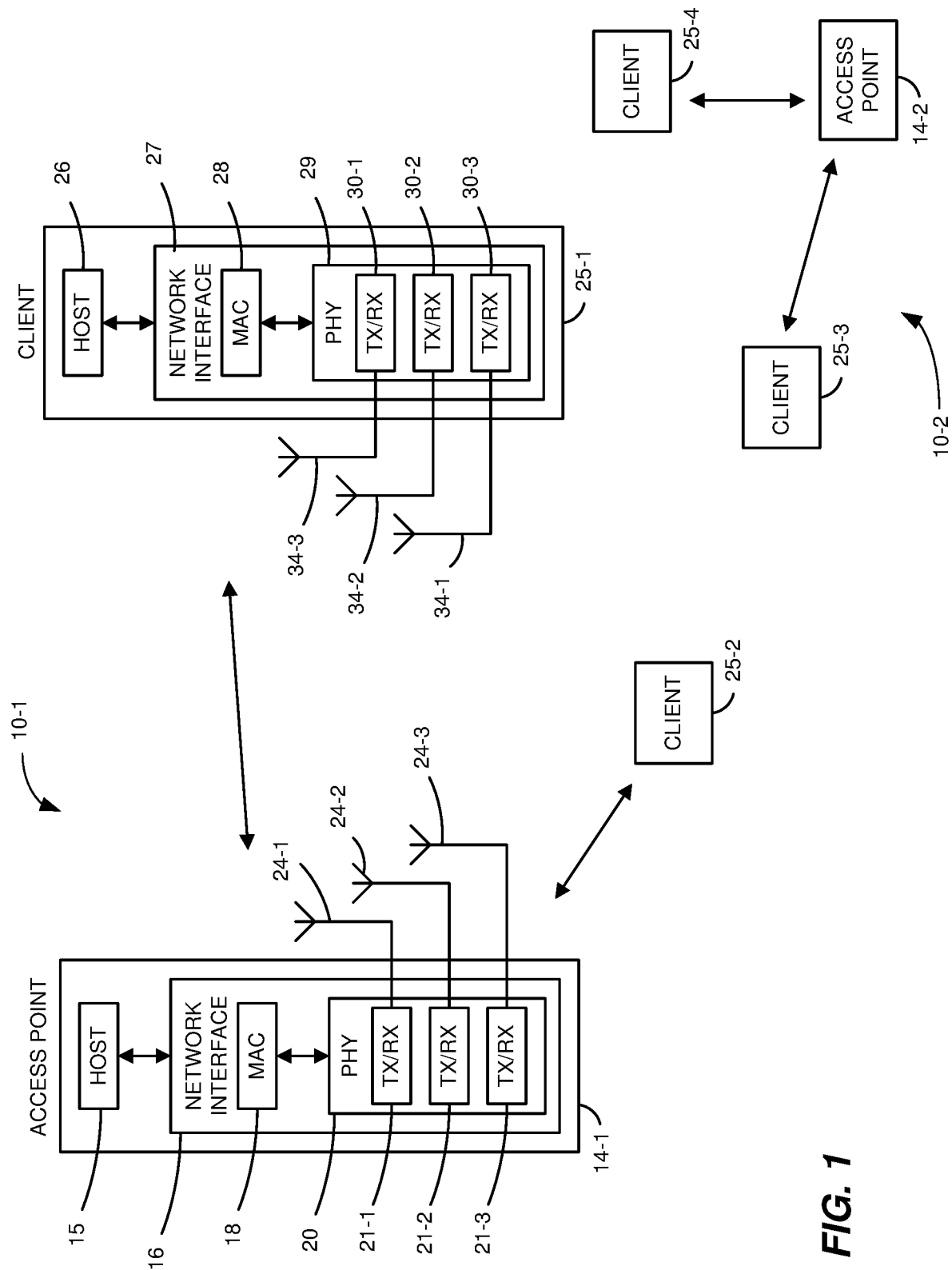
FIG. 1 is a block diagram of an example wireless local area network (WLAN), according to an embodiment.

FIG. 1 is a block diagram of example wireless local area networks (WLANs) 10-1 and 10-2, according to an embodiment. Although two WLANs are illustrated in FIG. 1 for exemplary purposes, other numbers (e.g., 1, 3, 4, 5, 6, etc.) of WLANs are present in other embodiments. Each WLAN 10 includes at least one AP 14. The configuration of the AP 14 may vary among different embodiments, but a typical configuration will now be described, using the AP 14-1 as an example. The AP 14-1 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14-1 includes other suitable numbers (e.g., 1, 2, 4, 5, etc.) of transceivers 21 and antennas 24 in other embodiments. In some embodiments, the AP 14-1 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol (e.g., a High Efficiency, HE, or 802.11ax communication protocol).

Each WLAN 10 includes a plurality of client stations 25. Although two client stations 25 in each of the WLANs 10 are illustrated in FIG. 1, each of the WLANs 10 includes different numbers (e.g., 1, 2, 3, 5, 6, etc.) of client stations 25 in various scenarios and embodiments.

The configuration of the client station 25 may vary among different embodiments, but a typically configuration will now be described, using the client station 25-1 as an example. The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

In an embodiment, one or more of the other client stations of the WLANs 10 have a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment. These same variations may be present in the client stations 25 of the second WLAN 10-2.

In various embodiments, the MAC processor 18 and the PHY processor 20 of the AP 14-1 are configured to generate data units conforming to the first communication protocol and having formats described herein. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client device 25-1 are configured to generate data units conforming to the first communication protocol and having formats described herein. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the first communication protocol and having formats described hereinafter and to determine that such data units conform to the first communication protocol, according to various embodiments.

Figure 2:
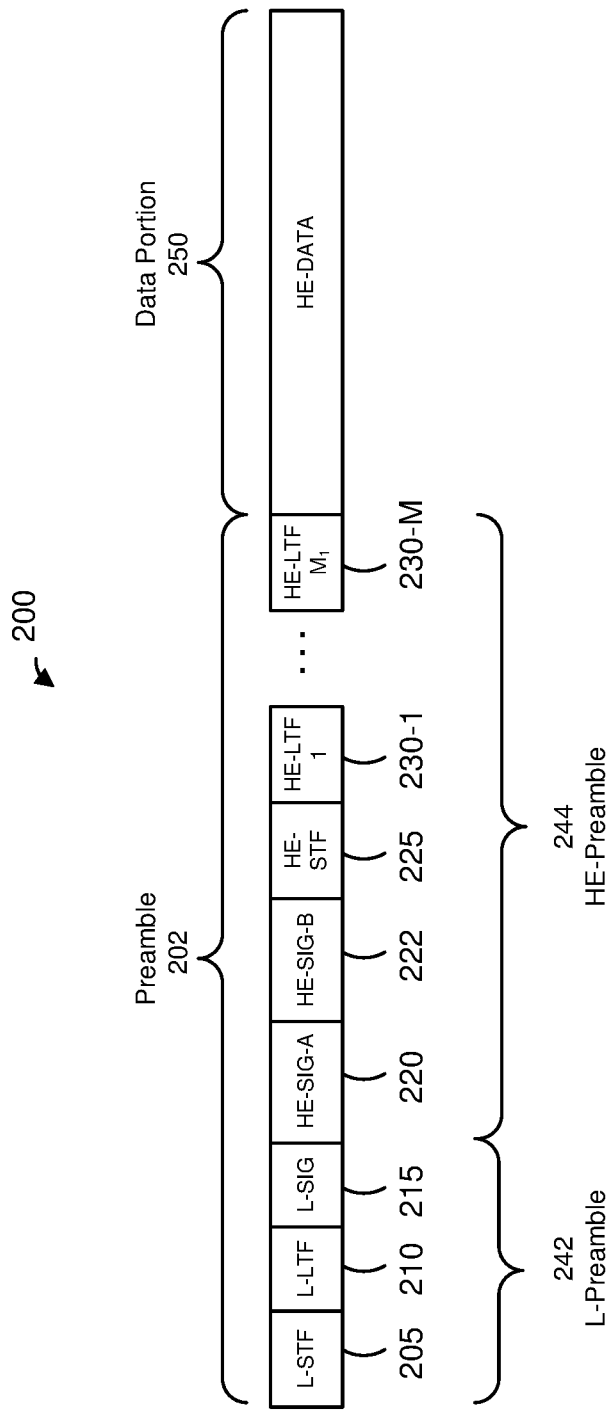
FIG. 2 is a diagram of an example physical layer (PHY) data unit, according to an embodiment.

FIG. 2 is a diagram of a physical layer (PHY) data unit 200 that an AP (e.g., the AP 14-1, the AP 14-2) is configured to transmit to one or more client stations (e.g., one or more client stations 25), according to an embodiment. In an embodiment, one or more client stations (e.g., one or more client stations 25-1) are also configured to transmit data units the same as or similar to the data unit 200 to an AP (e.g., the AP 14-1, the AP 14-2). The data unit 200 conforms to the HE communication protocol and occupies a 20 MHz bandwidth. Data units similar to the data unit 200 occupy other suitable bandwidth such as 40 MHz, 80 MHz, 160 MHz, 320 MHz, 640 MHz, for example, or other suitable bandwidths, in other embodiments. The data unit 200 is suitable for "mixed mode" situations, i.e. when the WLAN 10 includes a client station (e.g., the legacy client station 24-4) that conforms to a legacy communication protocol, but not the first communication protocol. The data unit 200 is utilized in other situations as well, in some embodiments.

In various embodiments and/or scenarios, the data unit 200 is a multi-user (MU) data unit downlink (DL) data unit, such as a DL orthogonal frequency division multiple access (OFDMA) unit and/or DL MU multiple input multiple output (MU-MIMO) data unit in which independent data streams are transmitted to multiple client stations 25 using respective sets of OFDM tones and/or respective spatial streams allocated to the client stations 25. Similarly, in various embodiments and/or scenarios, the data unit 200 is an MU uplink (UL) data unit, such as an UL OFDM data unit transmitted by a particular client station 25 as part of an OFDMA uplink transmission by multiple client stations 25 and/or an MU-MIMO uplink transmission, wherein each of the multiple client stations 25 transmits data using a set of OFDM tones and/or respective one or more spatial streams allocated to the client station 25. For example, in an embodiment, available OFDM tones (e.g., OFDM tones that are not used as DC tone and/or guard tones) are partitioned into multiple resource units (RUs), and each of the multiple RUs is allocated to one or more client stations 25 for transmission of data to, or by, the one or more of the client stations 25. In an embodiment, allocation of OFDM tones is performed using basic resource unit blocks defined by the first communication protocol. A basic resource unit block is sometimes referred to herein as simply a "basic resource unit." For example, a basic resource unit includes K OFDM tones, wherein K is an integer greater than zero, and each allocated resource unit is comprised of one or more K-OFDM tone basic resource units, in an embodiment. As just an example, K=26, in an embodiment. Accordingly, a basic resource unit includes 26 OFDM tones, in this embodiment. A resource unit allocated to a client station 25, or allocated to a multi-user group of client stations 25, includes a number of OFDM tones that is an integer multiple of 26 OFDM tones, such as 26 OFDM tones, 52 OFDM tones, 104 OFDM tones, etc., in this embodiment. In another embodiment, K is any suitable integer other than 26, and a basic resource unit includes a corresponding number of OFDM tones other than 26.

In some embodiments, the data unit 200 is a single user OFDM data unit. For example, the data unit 200 is a DL single user OFDM data unit transmitted by an AP (e.g., the AP 14-1) to a single client station (e.g., the client station 25-1) associated with the AP. In yet another embodiment, the data unit 200 is an UL single user OFDM data unit transmitted by a client station (e.g., the client station 25-1) to an AP (e.g., the AP 14-1) with which the client station is associated.

The data unit 200 includes a PHY preamble 202 including a legacy short training field (L-STF) 205, a legacy long training field (L-LTF) 210, a legacy signal field (L-SIG) 215, a first HE signal field (HE-SIG-A) 220, a second HE signal field (HE-SIG-B) 222, an HE short training field (HE-STF) 225, and M HE long training fields (HE-LTFs) 230. L-STF 205, L-LTF 210 and L-SIG 215 comprise a legacy preamble portion 242 of the PHY preamble 202. The HE-SIG-A 220, the HE-SIG-B 222, the HE-STF 225 and the M HE-LTFs 230 comprise an HE preamble portion 244 of the PHY preamble 202. In some embodiments and/or scenarios, the data unit 200 also includes a data portion 250. In some embodiments and/or scenarios, the data unit 200 omits the data portion 250.

In some embodiments and/or scenarios, the PHY preamble 202 omits one or more of the fields 205-235. For example, the PHY preamble 202 omits the HE-SIG-A 220 and/or the HE-SIG-B 222, in an embodiment. In some embodiments, the PHY preamble 202 includes additional fields not illustrated in FIG. 2.

Each of the L-STF 205, the L-LTF 210, the L-SIG 215, the HE-SIG-A 220, the HE-SIG-B 222, the HE-STF 225, and the M HE-LTFs 230 comprises one or more OFDM symbols. The HE-SIG-A 220 and the HE-SIG-B 222 is each individually encoded to generate the respective number of OFDM symbols, in an embodiment. As merely an example, in an embodiment, the HE-SIG-A 220 comprises two OFDM symbols, and the HE-SIG-B 222 comprises one OFDM symbol. As merely another example, in another embodiment, the HE-SIG-A 220 comprises one OFDM symbol, and the HE-SIG-B comprises two OFDM symbols. As yet another example, in an embodiment, the HE-SIG-A 220 comprises two OFDM symbols, and the HE-SIG-B 222 comprises a variable number of OFDM symbols. In an embodiment in which the HE-SIG-B 222 comprises a variable number of OFDM symbols, the particular number of HE-SIG-B 222 OFDM symbols in the data unit 200 is indicated in the HE-SIG-A 220.

In the embodiment of FIG. 2, the data unit 200 includes one of each of the L-STF 205, the L-LTF 210, the L-SIG 215, and the HE-SIG-A 220. In other embodiments in which a data unit similar to the data unit 200 occupies a cumulative bandwidth other than 20 MHz, each of the L-STF 205, the L-LTF 210, the L-SIG 215 and HE-SIG-A 220 is repeated over a corresponding number of 20 MHz sub-bands of the whole bandwidth of the data unit, in an embodiment. For example, in an embodiment, the data unit occupies an 80 MHz bandwidth and, accordingly, includes four of each of the L-STF 205, the L-LTF 210, the L-SIG 215, and the HE-SIG-A 220. In an embodiment in which a data unit similar to the data unit 200 occupies a cumulative bandwidth other than 20 MHz, the HE-SIG-B 222 is repeated over a corresponding number of 20 MHz sub-bands of the whole bandwidth of the data unit. In another embodiment in which a data unit similar to the data unit 200 occupies a cumulative bandwidth other than 20 MHz, the HE-SIG-B 222 includes different channel-specific portions corresponding to different 20 MHz sub-bands of the whole bandwidth of the data unit, and the different channel specific portions are transmitted in parallel in the corresponding 20 MHz sub-bands of the whole bandwidth of the data unit 200.

In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIG-B and the HE data portion occupy the corresponding whole bandwidth of the data unit.

In an embodiment, the HE-SIG-A 220 and the HE-SIG-B 222 generally carry information about the format of the data unit 200, such as information needed to properly decode at least a portion of the data unit 200, in an embodiment. In an embodiment in which the data unit 200 is a multi-user data unit, HE-SIG-A 220 carries information commonly needed by multiple intended receivers of the data unit 200. In some embodiments, HE-SIG-A 220 additionally includes information for receivers that are not intended receivers of the data unit 200, such as information needed for medium protection. On the other hand, HE-SIG-B 222 carries user-specific information individually needed by each intended receiver of the data unit 200, in an embodiment. In an embodiment, HE-SIG-A 220 includes information needed to properly decode HE-SIG-B 222, and HE-SIG-B 222 includes information needed to properly decode data streams in the data portion 250 of the data unit 200. In some embodiments and/or scenarios, however, HE-SIG-A field 220 includes information needed to decode the data portion 250, and HE-SIG-B 222 is omitted from the data unit 200 in at least some such embodiments. In at least some embodiments and scenarios in which an AP (e.g., the AP 14) is the intended recipient of the data unit 200 (i.e., when the data unit 200 is an uplink data unit), information needed to properly decode the data portion of the data unit 200 is known a priori to the intended recipient of the data unit 200 and need not be included in the preamble of the data unit 200. In some such embodiments, the HE-SIG-B 222 is omitted from the data unit 200.

In some embodiments, specific information included in the HE-SIG-A 220 and/or in the HE-SIG-B 222 depends on the mode of transmission of the data unit 200. For example, in an embodiment, different information is included in the HE-SIG-A 220 when the data unit 200 is a downlink data unit as compared to information included in the HE-SIG-A 220 when the data unit 200 is an uplink data unit. Additionally or alternatively, different information is included in the HE-SIG-A 220 when the data unit 200 is a multi-user data unit as compared to information included in the HE-SIG-A 220 when the data unit 200 is a single-user data unit, in an embodiment. In another embodiment, different information is included in the HE-SIG-B 222 when the data unit 200 is a downlink data unit as compared to the information is included in the HE-SIG-B 222 when the data unit 200 is an uplink data unit.

Figure 3:
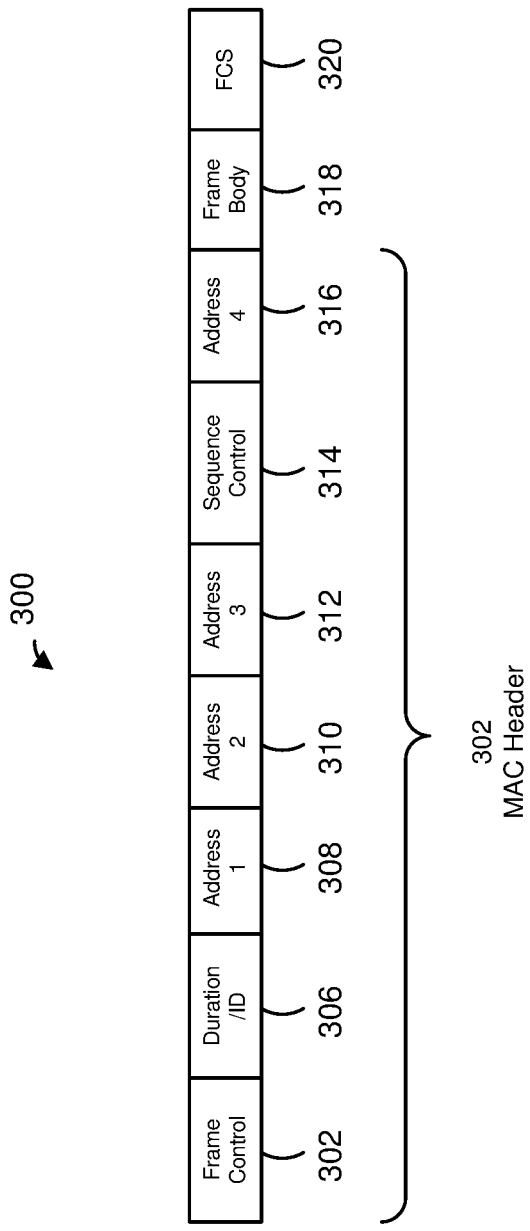
FIG. 3 is a diagram of an example MAC protocol data unit (MPDU), according to an embodiment.

FIG. 3 is a diagram of an example MAC protocol data unit (MPDU) 300, according to an embodiment. In an embodiment, the data portion 250 of the data unit 200 includes one or more MPDUs such as the MPDU 300. The MPDU 206 includes a MAC header 302 having a Frame Control field 304, a Duration/ID field 306, an Address 1 field 308, and Address 2 field 310, an Address 3 field 312, a Sequence Control field 314, and an Address 4 field 316. The MPDU 206 also includes a frame body 318 and a frame check sequence (FCS) 320. In an embodiment, the Duration/ID field 306 includes an indication of a duration of time (e.g., in microseconds) needed for transmission of one or more frame that will follow the data unit 200. For example, the Duration/ID field 306 includes an indication of a duration of time needed for transmission of an acknowledgement data unit to acknowledge receipt of the data unit 200, including a duration of an interframe space between the data unit 200 and the acknowledgement data unit to acknowledge receipt of the data unit 200. As another example, the Duration/ID field 306 includes an indication of an expected remaining duration of a transmission opportunity (TXOP) during which the data unit 200 is being transmitted, where the TXOP includes one or more additional frame exchanges in at least some situations. As yet another example, the Duration/ID field 306 includes an indication of a duration of time needed for (i) transmission of an acknowledgement data unit to acknowledge receipt of the data unit 200, (ii) transmission of at least one additional data unit that will follow the acknowledgement data unit, and (iii) transmission of at least one additional acknowledgement data unit to acknowledge the at least one additional data unit, including interframe spaces between transmissions of the data units.

In an embodiment, in at least some situations, if a device that "hears" transmission of the data unit 200 can decode the Duration/ID field 306 included in the data unit 200, then the device utilizes the value of the Duration/ID field 306 to determine a value of a channel access counter (e.g., a NAV counter) maintained by the device such that the device will refrain from transmitting for the duration indicated by the Duration/ID field 306 to protect transmission of the frame that follows the data unit 200.

Figure 4:
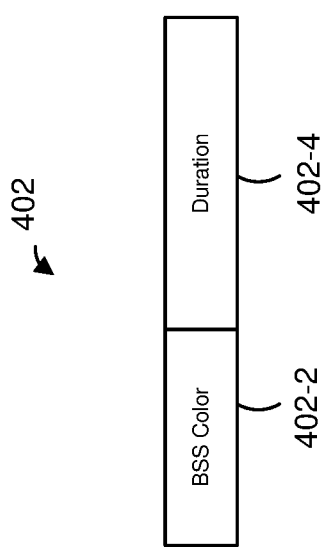
FIG. 4 is a diagram of several subfields included in a PHY preamble of a data unit, according to an embodiment.

FIG. 4 is a diagram of several subfields 402 included in a PHY preamble of a data unit, according to an embodiment. The subfields 402 include a BSS color subfield 402-2 and a duration subfield 402-4. In an embodiment, the BSS color subfield 402-2 and the duration subfield 402-4 are included in the PHY preamble 202 of the data unit 200. For example, the BSS color subfield 402-2 and the duration subfield 402-4 are included in the HE-SIG-A 220 of the PHY preamble 202, in an embodiment. In another embodiment, the BSS color subfield 402-2 and the duration subfield 402-4 are included in the HE-SIG-B 222 of the PHY preamble 202. In yet another embodiment, one of the BSS color subfield 402-2 and the duration subfield 402-4 is included in the HE-SIG-A 220 and the other one of the BSS color subfield 402-2 and the duration subfield 402-4 is included in the HE-SIG-B 222. In other embodiments, the BSS color subfield 402-2 and the duration subfield 402-4 are included in other suitable fields (e.g., one or more other signal fields not shown in FIG. 2) of the PHY preamble 202 of the data unit 200, or are included in a PHY preamble of a suitable data unit different from the data unit 200.

In an embodiment, the BSS color subfield 402-2 includes an identifier of a BSS (e.g., a BSS color) in which the data unit 200 is being transmitted. Accordingly, in an embodiment, a communication device (e.g., AP 14 or client station 25) that transmits the data unit 200 sets the BSS color subfield 402-2 to include the BSS color of a BSS to which the communication device corresponds (e.g., with which the communication device is associated). Thus, for example, if the data unit 200 is transmitted by the AP 14-1 or one or the client stations 25-1, 25-2 of the WLAN 10-1, then the BSS color subfield 402-2 includes an identifier of the BSS corresponding the WLAN 10-1, in an embodiment. On the other hand, if the data unit 200 is transmitted by the AP 14-2 or one or the client stations 25-3, 25-4 of the WLAN 10-2, then the BSS color subfield 402-2 includes an identifier of the BSS corresponding the WLAN 10-2, in an embodiment. In an embodiment, the BSS color of a BSS is shorter (e.g., includes fewer bits) than a BSSID of the BSS, where the BSSID of the BSS is an address (e.g., a MAC address) of an AP of the BSS, for example.

The duration subfield 402-4 is set to indicate a duration of time (e.g., in microseconds) for which the communication medium is expected to be busy, in an embodiment. The duration subfield 402-4 indicates a duration that is the same as or similar to a duration indicated in the Duration/ID field 306, in an embodiment. The duration subfield 402-4, however, includes fewer bits than a number of bits included in the Duration/ID field 306, in some embodiments. In an embodiment, the duration subfield 402-4 includes an indication of a duration of time (e.g., in microseconds) needed for transmission of one or more frame that will follow the data unit 200. For example, the duration subfield 402-4 includes an indication of a duration of time needed for transmission of an acknowledgement data unit to acknowledge receipt of the data unit 200, including a duration of an interframe space between the data unit 200 and the acknowledgement data unit to acknowledge receipt of the data unit 200. As another example, the duration subfield 402-4 includes an expected remaining duration of a transmission opportunity (TXOP) during which the data unit 200 is being transmitted, where the TXOP includes one or more additional frame exchanges in at least some embodiments. As yet another example, the duration subfield 402-4 includes an indication of a duration of time needed for (i) transmission of an acknowledgement data unit to acknowledge receipt of the data unit 200, (ii) transmission of at least one additional data unit that will follow the acknowledgement data unit, and (iii) transmission of at least one additional acknowledgement data unit to acknowledge receipt of the at least one additional data unit, including interframe spaces between transmissions of the data units. The indicated duration of time needed for (i) transmission of the acknowledgement data unit to acknowledge receipt of the data unit 200, (ii) transmission of at least one additional data unit that will follow the acknowledgement data unit, and (iii) transmission of at least one additional acknowledgement data unit to acknowledge receipt of the at least one additional data unit, including interframe spaces between transmissions of the data units, is less than the remaining duration of the TXOP in which the data unit 200 is being transmitted, in some situations, in an embodiment.

In an embodiment, a communication device (e.g., an AP 14 or a client station 25) receiving a data unit decodes one or both (i) a duration indication in a PHY preamble of the data unit (e.g., included in the duration subfield 402-4 of the PHY preamble) and (ii) a duration indication in a MAC header of the data unit (e.g., included in the Duration/ID field 306 of the MAC header). In an embodiment, the communication device then relies on a decoded one of (i) the duration indication in the PHY preamble of the data unit or (ii) the duration indication in the MAC header of the data unit to set or reset its NAV according to rules and techniques described herein. In an embodiment, the duration indication in the MAC header of the data unit includes a greater number of bits than a number of bits of the duration indication in the PHY preamble of the data unit. In an embodiment, a smaller granularity is used to more accurately indicate the duration using the greater number of bits in the MAC header as compared to a less accurate duration indicated using less bits and a larger granularity in the PHY preamble of the data unit. Accordingly, in an embodiment, if a communication device is able to decode the duration indication in the Duration/ID field 306, then the communication device decodes the duration indication in the Duration/ID field 306 and utilizes the duration indicated in the Duration/ID field 306 to set or reset its NAV, in an embodiment. Thus, for example, if the communication device decodes both (i) the duration indication in the duration subfield 402-4 included in the PHY preamble of the data unit and (ii) the duration indication in the Duration/ID field 306 included in the MAC header of the data unit, then the communication device utilizes the duration indicated in the Duration/ID field 306 to set or reset its NAV, in an embodiment. On the other hand, if the communication device is unable to decode the Duration/ID field 306, then the communication device instead utilizes on the duration indicated in the duration subfield 402-4 to set or reset its NAV, in an embodiment.

In an embodiment and scenario, a duration indication in the PHY preamble of a data unit (e.g., included in the duration subfield 402-4 of the PHY preamble) is set to an invalid value, such as all ones, for example, or another suitable invalid duration value. The invalid value of the duration indication in the PHY preamble of a data unit indicates to a communication device that receives the data unit that the communication device should ignore the duration indication in the PHY preamble of the data unit, in an embodiment. Accordingly, the communication device disregards the invalid value of the duration indication in the PHY preamble and attempts to obtain a duration indication from a MAC header of the data unit (e.g., from the Duration/ID field 306 of the MAC header). If successful, the communication device then utilizes the duration indicated in the MAC header to set or reset its NAV, in an embodiment.

Figure 5:
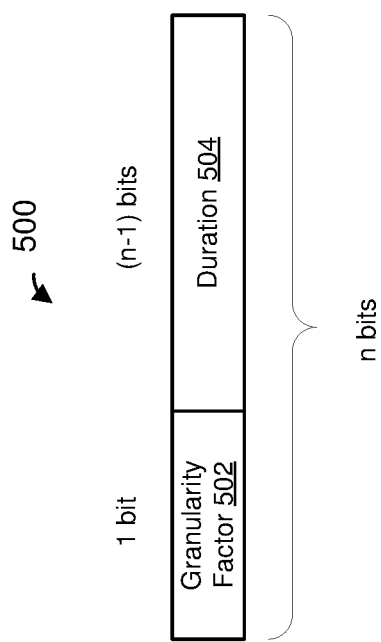
FIG. 5 is a diagram of a duration subfield included in a signal field of a PHY preamble of a data unit, in an embodiment.

FIG. 5 is a diagram of a duration subfield 500 included in a signal field of a PHY preamble of a data unit, in an embodiment. In an embodiment, the duration subfield 500 corresponds to the duration subfield 402-4 of FIG. 4. The duration subfield 500 included in the signal field of the PHY preamble of the data unit is relatively short (e.g., comprises relatively few bits), in an embodiment. For example, the duration field 500 is relatively shorter (e.g., comprises relatively fewer bits) than a duration field (e.g., the duration/ID field 306 of FIG. 3) included in a MAC header of the data unit, in an embodiment. The duration subfield 500 comprises n bits, where n is an integer greater than zero. In an example embodiment n=7. In another example embodiment, n=8. In other embodiments, n is another suitable number of bits (e.g., 1, 2, 3, 4, 5, 6, 9, etc.).

In an embodiment, the duration subfield 500 includes a granularity sub-subfield 502 and a duration indication sub-subfield 504. In an embodiment, the granularity sub-subfield 502 comprises one bit, and the duration indication sub-subfield 504 comprises (n–1) bits. In another embodiment, the granularity sub-subfield 502 comprises a suitable number of bits other than one bit (e.g., 2 bits, 3 bits, etc.). In general, the granularity sub-subfield 502 comprises m bits, where m is an integer greater than zero, and the duration indication sub-subfield 504 comprises (n-m) bits, in various embodiments.

The granularity sub-subfield 502 indicates a granularity used in the duration indication sub-subfield 504, and the duration indication sub-subfield 504 includes an unscaled duration indication that indicates a duration within a set of possible duration values that can be indicated by the number of bits of the duration indication sub-subfield 504 and with the granularity indicated by the granularity sub-subfield 502, in an embodiment. For example, in an embodiment in which the granularity sub-subfield 502 comprises one bit, a first value of the one bit indicates that the duration indication sub-subfield 504 indicates a duration value from among a set of possible duration values corresponding to a first granularity, and a second value of the one bit indicates that the duration indication sub-subfield 504 indicates a duration value from among a set of possible duration values corresponding to a second granularity. In an embodiment, the first granularity is relatively smaller as compared to the second granularity. As just an example, in an embodiment in which the granularity sub-subfield 502 comprises one bit and the duration indication sub-subfield 504 comprises four bits, a first value of the one bit of the granularity sub-subfield 502 (e.g., a logic zero (0)) indicates a granularity of 16 microseconds (µs) in the duration indicated by the duration indication sub-subfield 504, and a second value of the one bit of the granularity sub-subfield 502 (e.g., a logic one (1)) indicates a granularity of 512 µs in the duration indicated by the duration indication sub-subfield 504. Accordingly, in this example embodiment, when the indication sub-subfield 504 is set to the first value (e.g., a logic zero (0)), the four bit duration indication sub-subfield 504 indicates a duration in the range of 16 µs to 512 µs with granularity of 16 µs. Further, in this embodiment, when the indication sub-subfield 504 is set to the second value (e.g., a logic one (1)), the four bit duration indication sub-subfield 504 indicates a duration in the range of 512 µs to 8192 µs with granularity of 512 µs. As another example, in an embodiment in which the granularity sub-subfield 502 comprises one bit and the duration indication sub-subfield 504 comprises six bits, a first value of the one bit of the granularity sub-subfield 502 (e.g., a logic zero (0)) indicates a granularity of 4 µs in the duration indicated by the duration indication sub-subfield 504, and a second value of the one bit of the granularity sub-subfield 502 (e.g., a logic one (1)) indicates a granularity of 64 µs in the duration indicated by the duration indication sub-subfield 504. Accordingly, in this example embodiment, when the indication sub-subfield 504 is set to the first value (e.g., a logic zero (0)), the six bit duration indication sub-subfield 504 indicates a duration in the range of 4 µs to 256 µs with granularity of 4 µs. Further, in this embodiment, when the indication sub-subfield 504 is set to the second value (e.g., a logic one (1)), the four bit duration indication sub-subfield 504 indicates a duration in the range of 64 µs to 4096 µs with granularity of 64 µs.

In some embodiments, if the duration to be indicated by the duration subfield 500 can be represented using either a smaller granularity (e.g., 4 µs) or a larger granularity (e.g. 64 µs), then the smaller granularity is selected for indicating the duration. Thus, for example, a communication device setting the duration subfield 500 determines whether duration to be indicated by the duration subfield 500 can be represented using a smaller granularity. If the communication device determines that the duration can be indicated using the smaller granularity, then the communication device sets the duration subfield 500 using the smaller granularity. On the other hand, if the communication device determines that the duration cannot be indicated using the smaller granularity (e.g., if the duration to be indicated is greater than a greatest duration within the range that can be indicated using the smaller granularity), then the communication device sets the duration subfield 500 using a larger granularity. Selecting the smaller granularity for representing the duration in a PHY preamble of a data unit generally decreases the difference between the duration indicated in a MAC header of the data unit and the duration indicated in the PHY preamble of the data unit, in at least some embodiments. Accordingly, in such embodiments, unfairness between a device that decodes the duration in MAC header of the data unit and a device that decodes the duration in the PHY preamble of the data unit is reduced or eliminated.

In an embodiment, each communication device (e.g., an AP 14 or a client station 25) maintains channel access counter (e.g., a NAV counter) that indicates a prediction of future traffic in the communication medium in which the communication device communicates with at least one other communication device. In an embodiment, the communication device sets and/or updates (resets) its channel access counter based on data units that are received by the communication device but are addressed to other communication devices in the vicinity of the communication devices. The communication device continually counts down the channel access counter, in an embodiment. Once the channel access counter reaches zero, the communication device may begin contending for the medium. In an embodiment, the communication device contends for the medium using a clear channel assessment (CCA) with backoff procedure. If the medium is clear for a predetermined duration of time, then the communication device gains access to the medium and begins transmission in the medium, in an embodiment.

In an embodiment, when a communication device (AP 14 or client station 25) of a WLAN 10 receives a data unit (e.g., the data unit 200), the communication device determines a BSS corresponding to the data unit and a duration indicated in the data unit. For example, in an embodiment, the communication device identifies the BSS corresponding to the data unit based on the BSS color subfield 402-2 included in a PHY preamble of the data unit, in an embodiment. The communication device determines the BSS corresponding to the data unit based on a RA and/or a TA included in a MAC header of the data unit, in another embodiment. In an embodiment, the communication device determines the duration indicated in the data unit based on the duration subfield 402-4 included in the PHY preamble of the data unit and/or based on the Duration/ID field 306 included in a MAC header of the data unit. The communication device utilizes the identity of the BSS to which the data unit corresponds and the duration determined based on a duration indication in the data unit to determine whether and how to reset its NAV based on the data unit, in an embodiment. More specifically, in an embodiment, the communication device determines whether and how to reset the current value of the NAV counter of the communication device using (i) the current value of the NAV counter, (ii) the BSS currently associated with the NAV counter, (iii) the value of the BSS color subfield 402-2 and (iv) the value of the duration subfield 402-4. In an embodiment, the communication device updates its NAV based on a data unit according to the following rules:

(1) If (i) the BSS to which the data unit corresponds is different from a BSS with which the communication device is associated, and (ii) the duration indicated in the data unit is greater than the current value of the NAV counter of the communication device, then the communication device sets the value of the NAV counter to the duration indicated in the data unit. Additionally, the communication device associates the NAV counter with an identifier of the BSS to which the data unit corresponds, in an embodiment. For example, the communication device associates the NAV counter with the BSS color indicated in the data unit, in an embodiment. As an example, the communication device records the value of the BSS color indicated in the data unit as an association between the NAV counter and the BSS to which the data unit corresponds, in an embodiment. The communication device associates the NAV counter with the RA address and/or the TA address indicated in the data unit, in another embodiment.

(2) If (i) the data unit corresponds to the BSS with which the communication device is associated, (ii) the data unit is addressed to another communication device, and (iii) the duration indicated in the data unit is greater than the current value of the NAV counter of the communication device, then the communication device sets the value of the NAV counter to the duration indicated in the data unit. Additionally, the communication device associates the NAV counter with an identifier of the BSS to which the data unit corresponds, in an embodiment. For example, the communication device associates the NAV counter with the BSS color indicated in the data unit, in an embodiment. As an example, the communication device records the value of the BSS color indicated in the data unit as an association between the NAV counter and the BSS to which the data unit corresponds, in an embodiment. The communication device associates the NAV counter with the RA address and/or the TA address indicated in the data unit, in another embodiment.

(3) If the data unit corresponds to the BSS currently associated with the NAV counter, then the communication device sets the value of the NAV counter to the duration indicated in the data unit. Additionally, the communication device associates the NAV counter with an identifier of the BSS to which the data unit corresponds, in an embodiment. For example, the communication device associates the NAV counter with the BSS color indicated in the data unit, in an embodiment. As an example, the communication device records the value of the BSS color indicated in the data unit as an association between the NAV counter and the BSS to which the data unit corresponds, in an embodiment. The communication device associates the NAV counter with the RA address and/or the TA address indicated in the data unit, in another embodiment.

Thus, according to rule (3), if the communication device receives a data unit that corresponds to the same BSS as a previous data unit based on which the device's NAV is currently set, the communication device resets its NAV to the duration indicated in the current data unit even if the duration indicated in the current data unit is not greater than (e.g., is less than or equal to) the current value of the NAV counter of the communication device, in an embodiment.

Figure 6:
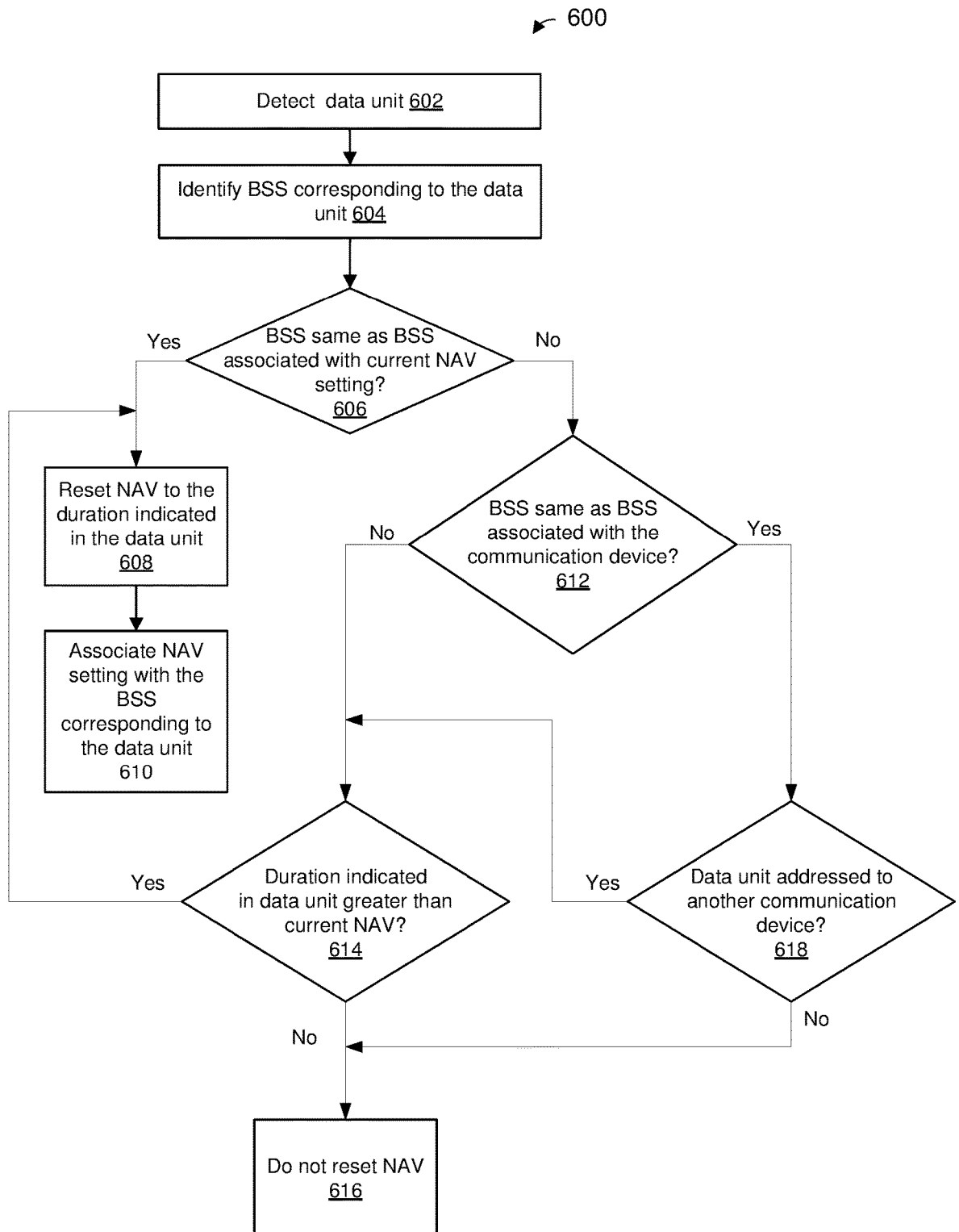
FIG. 6 is a flow chart of an example technique used by a communication device to maintain a channel access counter, according to an embodiment.

FIG. 6 is a flow chart of an example technique 600 used by a communication device to maintain a channel access counter (e.g., a NAV counter), according to an embodiment. The example technique 600 operates according to rules (1)-(3) above. The technique 600 is implemented by an AP (e.g., an AP 14) or a client station (e.g., a client station 25) to determine whether and how to reset the current value of its NAV counter based on a data unit that is detected to "heard" by the AP or the client station 25, in an embodiment.

At a block 602, the communication device detects a data unit. At block 604, the communication device identifies a BSS corresponding to the data unit. For example, the communication device identifies the BSS corresponding to the data unit based on a value of a BSS color subfield, such as the BSS color field 402-2 of FIG. 4, included in a signal field of a PHY preamble of the data unit.

At block 606, the communication device determines whether the BSS corresponding to the data unit is the same as a BSS associated currently associated with the NAV counter of the communication device. For example, in an embodiment, the communication device compares the BSS color indicated in the data unit with a BSS color currently associated with the NAV counter at the communication device. In another embodiment, the communication device compares an RA and/or a TA address indicated in the data unit with an RA and/or a TA address currently associated with the NAV counter of the communication device. If the communication device determines that the BSS corresponding to the data unit is the same as the BSS currently associated with the NAV counter of the communication device, then the technique 600 proceeds to blocks 608. At block 608, the communication device resets the current value of the NAV counter based on a duration indication included in the data unit. In an embodiment, the communication device resets the current value of the NAV counter based on a duration indication included in a signal field of a PHY preamble of the data unit. For example, the communication device resets the current value of the NAV counter based on a duration indicated by the duration subfield 402-4 of FIG. 4 included in a signal field of the PHY preamble of the data unit. In another embodiment, the communication device resets the current value of the NAV counter based on a duration indicated in a MAC header of the data unit, such as a duration indicated in the Duration/ID field 306 of the MAC header if the data unit. At block 610, the communication device associates the NAV counter, reset at block 608, with the BSS corresponding to the data unit.

Returning to block 606, if the communication device determines that the BSS color corresponding to the data unit is different from the BSS color currently associated with the NAV counter of the communication device, then the technique 600 proceeds to block 612. At block 612, the communication device determines whether the BSS corresponding to the data unit is the same as a BSS with which the communication device is associated. For example, the communication device compares the BSS color indicated in the data unit with a BSS color corresponding to an AP of the BSS with which the communication device is associated (e.g., if the communication device is a client station), or compares the BSS color indicated in the data unit with its own BSS color (e.g., if the communication device is an AP), in an embodiment. In another embodiment, the communication device compares an RA and/or a TA address indicated in the data unit with a MAC address of an AP of the BSS with which the communication device is associated. If the communication device determines at block 612 that the BSS corresponding to the data unit is different from the BSS with which the communication device is associated, then the technique 600 proceeds to block 614. At block 614, the communication device determines whether a duration indicated in the data unit is greater than the current value of the NAV counter of the communication device. In an embodiment, the communication device compares a duration indicated in a signal field of the PHY preamble of the data unit with the current value of the NAV counter of the communication device. For example, the communication device compares (i) a value of a duration subfield 402-4 of FIG. 4 included in a signal field of the PHY preamble of the data unit with (ii) the current value of the NAV counter of the communication device. If the communication device determines that the duration indicated in the data unit is greater than the current value of the NAV counter of the communication device, then blocks 608, 610 are implemented. Accordingly, in this case, the communication device resets the current value of the NAV counter based on the duration indicated in the data unit, and associates the reset NAV counter with the BSS corresponding to the data unit as described above, in an embodiment.

On the other hand, if the communication device determines at block 614 that the duration indicated in the data unit is not greater than (e.g., is less than or equal to) the current value of the NAV counter of the communication device, then the communication device does not reset current value of the NAV counter (block 616), in an embodiment.

Returning to block 612, if the communication device determines that the BSS corresponding to the data unit is the same as the BSS with which the communication device is associated, then the technique 600 proceeds to block 618. At block 618, the communication device determines whether the data unit is addressed to another communication device rather than itself. In an embodiment, the communication device compares a destination address included in a MAC header, such as the MAC header 300 of FIG. 3, of the data unit to its own address. If the communication device determines at block 618 that the data unit is not addressed to another communication device (i.e., that the data unit is addressed to itself), then the technique 600 proceeds to block 616. Accordingly, in this case, the communication device does not reset the current value of the NAV counter, in an embodiment. On the other hand, if the communication device determines at block 618 that the data unit is addressed to another communication device, then block 614 is implemented. As a result, in this case, if a duration indicated in the data unit is greater than the current value of the NAV counter of the communication device, then the communication device resets the current value of the NAV counter and associates the NAV counter with the BSS corresponding to the data unit as described above, in an embodiment. On the other hand, if a duration indicated in the data unit is not greater than (e.g., less than or equal to) the current value of the NAV counter of the communication device, then the communication device does not reset the current value of the NAV counter, in an embodiment.

In an embodiment, a communication device operating according to rules (1)-(3) described above, such as a communication device implementing the technique 600, will reset its NAV counter based on a duration indicated in a data unit if the BSS corresponding to the data unit is the same as the BSS of a pervious data unit based on which NAV is currently set at the communication device. As a result, if the data unit is the last data unit to be transmitted in a TXOP and the duration indicated in the data unit is shorter than a previously expected remaining duration of the TXOP, then the TXOP will be terminated at the communication device according to the shorter duration indicated in the data unit, in an embodiment. Thus, transmission of an additional frame, such as a contention free end (CF end) frame is not needed for early termination of a TXOP, in at least some scenarios, in an embodiment. On the other hand, transmission of an additional frame, such as a contention free end (CF end) frame is required for early termination of a TXOP in some situations, for example when the TXOP is used for uplink multi-user transmission from multiple client stations to an AP, in an embodiment.

Figure 7:
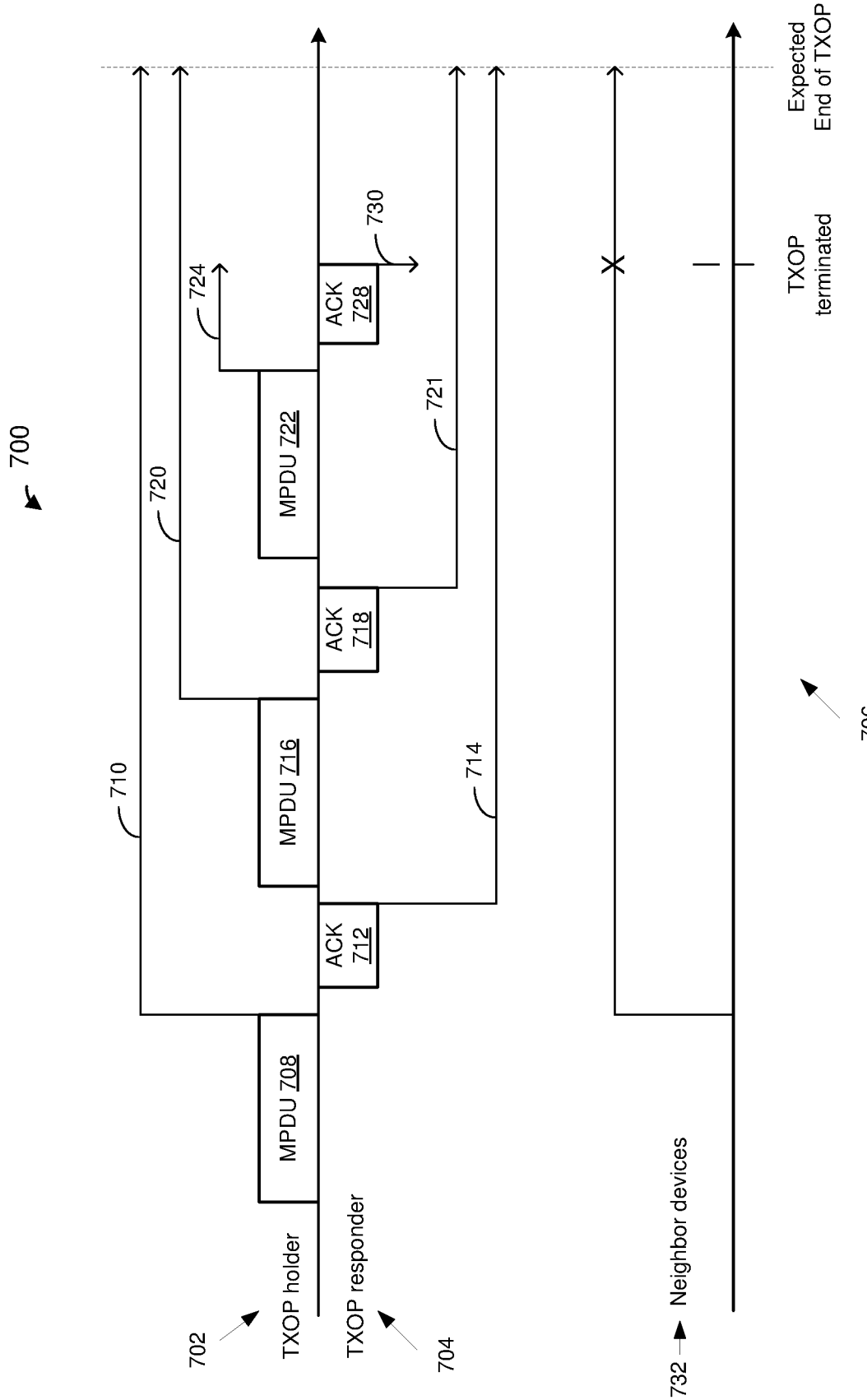
FIG. 7 is a diagram of an example frame exchange during a transmission opportunity (TXOP), according to an embodiment.

FIG. 7 is a diagram of a frame exchange 700 between a TXOP holder 702 and a TXOP responder 704 during a TXOP 706, according to an embodiment. In an embodiment, TXOP holder 702 is an AP 14 (e.g., the AP 14-1) and the TXOP responder 704 is a client station 25 (e.g., the client station 25-1). In another embodiment, the TXOP holder 702 is a client station (e.g., the client station 25-1) and the TXOP responder 704 is an AP (e.g., the AP 14-1). In other embodiments, the TXOP holder 702 and/or the TXOP responder 704 are communication devices in suitable networks different from the WLANs 10. For ease of explanation, BSS identification and duration indication in various data units are explained with reference to the BSS color subfield 402-2 and the duration subfield 402-4 included in PHY preambles of the corresponding data units. However, BSS identification and duration indication included in a MAC header can be used instead of the corresponding indications in a PHY preamble of the data unit in at least some situations, as described above, for example, in some embodiments.

The TXOP holder 702 transmits a data unit 708. In an embodiment, the data unit 708 is a downlink single user data unit from an AP (TXOP holder) to a client station 25(TXOP responder). In another embodiment, the data unit 708 is an uplink single user data unit from a client station 25 (TXOP holder) to an AP (TXOP responder). In yet another embodiment, the data unit 708 is a downlink multi-user data unit, such as a downlink MU-MIMO data unit or a downlink OFDMA data unit, from an AP (TXOP holder) to multiple client stations 25 (TXOP responders). The data unit 708 is the same as or similar to the data unit 200 of FIG. 2, in an embodiment. The data unit 708 includes the BSS color subfield 402-2 and the duration subfield 402-4 (FIG. 4) in a signal field of a PHY preamble of the data unit 708, in an embodiment. The BSS color subfield in the data unit 708 is set to indicate a color of the BSS to which the TXOP holder 702 corresponds (e.g., the BSS with which the TXOP holder 702 is associated), in an embodiment. The duration subfield in the data unit 708 is set to indicate an expected remainder of the TXOP 706 after the end of the data unit 708, as indicated in FIG. 7 by an arrow 710, in an embodiment.

In response to receiving the data unit 708, the TXOP responder 704 transmits an acknowledgement (ACK) data unit 712. The ACK data unit 712 includes the BSS color subfield 402-2 and the duration subfield 402-4 (FIG. 4) in a signal field of a PHY preamble of the ACK data unit 712, in an embodiment. The BSS color subfield in the ACK data unit 712 is set to indicate a color of the BSS to which the TXOP responder 704 corresponds (e.g., the BSS with which the TXOP responder 704 is associated), in an embodiment. The duration subfield in the ACK data unit 712 is set to indicate an expected remainder of the TXOP 706 after the end of the ACK data unit 712, as indicated in FIG. 7 by an arrow 714, in an embodiment After receiving the ACK data unit 712, the TXOP holder transmits a data unit 716, in an embodiment. The data unit 716 is generally the same as the data unit 708, in an embodiment. The data unit 716 includes the BSS color subfield 402-2 and the duration subfield 402-4 (FIG. 4) in a signal field of a PHY preamble of the data unit 716, in an embodiment. The BSS color subfield 402-2 in the data unit is set to indicate a color of the BSS to which the TXOP holder 702 corresponds (e.g., the BSS with which the TXOP holder 702 is associated), in an embodiment. The duration subfield 402-4 is set to indicate an expected remainder of the TXOP 706 after the end of the data unit 716, as indicated in FIG. 7 by an arrow 720, in an embodiment.

In response to receiving the data unit 714, the TXOP responder 704 transmits an ACK data unit 718. The ACK data unit 718 includes the BSS color subfield 402-2 in the data unit and the duration subfield 402-4 (FIG. 4) in a signal field of a PHY preamble of the ACK data unit 718, in an embodiment. The BSS color subfield in the ACK data unit 718 is set to indicate a color of the BSS to which the TXOP responder 704 corresponds (e.g., the BSS with which the TXOP responder 704 is associated), in an embodiment. The duration subfield in the ACK data unit 718 is set to indicate an expected remainder of the TXOP 706 after the end of the ACK data unit 718, as indicated in FIG. 7 by an arrow 721, in an embodiment.

After receiving the ACK data unit 718, the TXOP holder transmits a data unit 722, in an embodiment. The data unit 722 is generally the same as the data unit 708, in an embodiment. The data unit 722 includes the BSS color subfield 402-2 and the duration subfield 402-4 (FIG. 4) in a signal field of a PHY preamble of the data unit 716, in an embodiment. The BSS color subfield 402-2 in the data unit is set to indicate a color of the BSS to which the TXOP holder 702 corresponds (e.g., the BSS with which the TXOP holder 702 is associated), in an embodiment. The data unit 722 is the last data unit to be transmitted by the TXOP holder 702 in the TXOP 706, in an embodiment. However, time required for transmitting the data unit 722 and an acknowledgement data unit to acknowledge receipt of the data unit 722 is less than the previously expected remaining duration of the TXOP 706. In an embodiment, the duration subfield 402-4 is set to indicate a time, after the end of the data unit 722, needed to transmit an ACK data unit that is expected to follow reception of the data unit 722, as indicated in FIG. 7 by an arrow 724.

In response to receiving the data unit 722, the TXOP responder 704 transmits an ACK data unit 728. The acknowledgement data unit 718 includes the BSS color subfield 402-2 in the data unit and the duration subfield 402-4 (FIG. 4) in a signal field of a PHY preamble of the acknowledgement data unit 728, in an embodiment. The BSS color subfield 402-2 in the acknowledgement data unit 728 is set to indicate a color of the BSS to which the TXOP responder 704 corresponds (e.g., the BSS with which the TXOP responder 704 is associated), in an embodiment. Based on the duration indication in the data unit 722, the TXOP responder 704 sets the duration subfield 402-4 in the acknowledgement data unit 728 to zero, as indicated in FIG. 7 by an arrow 730, in an embodiment.

A neighboring device 732 in not a participant of the TXOP 706. But the neighboring device 732 is able to "hear" transmissions of the TXOP 706, in an embodiment. In an embodiment, the neighboring device 732 is operating in a same BSS with the TXOP holder 702 and the TXOP responder 704. As an example, the AP 14-1 corresponds to the TXOP holder 702, the client station 25-1 corresponds to the TXOP responder 704, and the client station 25-2 corresponds to the neighbor device 732, in an embodiment. In another embodiment, the neighboring device 732 is operating in a same BSS as the TXOP holder 702 and the TXOP responder 704 is operating in a different BSS from the TXOP holder 702 and the TXOP responder 704. As an example, the AP 14-1 corresponds to the TXOP holder 702, the client station 25-1 corresponds to the TXOP responder 704, and the client station 25-3 corresponds to the neighbor device 732, in an embodiment.

In an embodiment, the neighboring device 732 is configured to set and reset its NAV according to the rules (1)-(3) described above. The neighboring device 732 is configured to implement the technique 600 of FIG. 6 for resetting its NAV, in an embodiment. The neighboring device 732 updates its NAV based on durations indicated in each of the (i) the current setting of NAV of the neighboring device 732 at the time when the data unit is detected, (ii) the BSS color associated with the current setting of NAV of the neighboring device 732, (iii) the value of the BSS color subfield 402-2 in the data unit and (iv) the value of the duration subfield 402-4 in the data unit as described above, in an embodiment. Thus, for example, when the neighboring device 732 detects the data unit 708, the neighboring device 732 sets its NAV based on the duration indicated in the duration subfield 402-4 in the data unit 708. The neighboring device 732 also associates the NAV set based on the duration indicated in the duration subfield 402-2 in the data unit 708 with the BSS color indicated in the BSS color subfield 402-2 in the data unit 708. Subsequently, when the neighboring device 732 detects the data unit 722, if the current NAV setting still corresponds to the NAV set based on the data unit 708, for example if the neighboring device 732 has not reset the NAV based on a data unit corresponding to an overlapping BSS, then the neighboring device 732 resets the NAV based on the duration indicated in the duration subfield 402-4 of the data unit 722, even though the duration indicated in the duration subfield 402-4 of the data unit 722 is less than the current NAV setting of the neighboring device 732, in an embodiment, because in this case the BSS color indicated in the BSS color subfield 402-2 of the data unit 722 is the same as the BSS color associated with the current NAV setting of the neighboring device 732. Thus, in this case, the data unit 722 effectively terminates the TXOP 706 at the neighboring device 732 prior to the end of the initial expected duration of the TXOP 706, in an embodiment.

On the other hand, if the neighboring device 732 reset its NAV based on a data unit corresponding to an OBSS before detecting the data unit 722, then the neighboring device 732 does not reset its NAV based on the data unit 722 if the duration indicated in the duration subfield 402-4 of the data unit 722 is shorter than the current NAV setting of the neighboring device 732, because in this case the BSS color indicated in the BSS color subfield 402-2 of the data unit 722 is different from the BSS color associated with the current NAV setting of the neighboring device 732, in an embodiment. Accordingly, the data unit 722 does not prematurely terminate a TXOP of the BSS that is different from the BSS corresponding to the data unit 722, in this embodiment.

Figure 8:
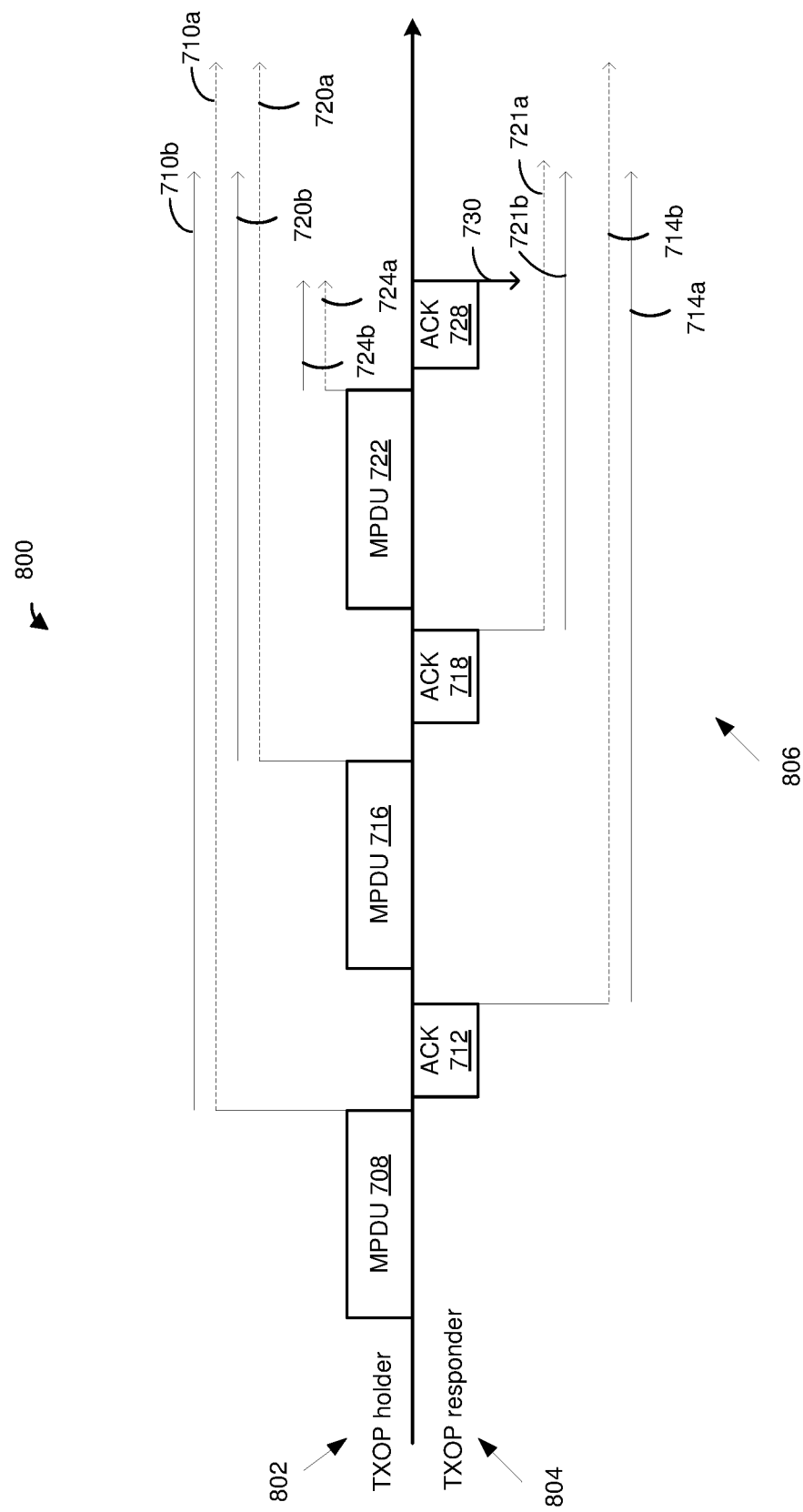
FIG. 8 is a diagram of another example frame exchange during a TXOP, according to an embodiment.

FIG. 8 is a diagram of a frame exchange 800 between a TXOP holder 802 and a TXOP responder 804 during a TXOP 806, according to an embodiment. In an embodiment, the TXOP holder 802 is an AP 14 (e.g., the AP 14-1) and the TXOP responder 804 is a client station 25 (e.g., the client station 25-1). In another embodiment, the TXOP holder 802 is a client station (e.g., the client station 25-1) and the TXOP responder 804 is an AP (e.g., the AP 14-1). In other embodiments, the TXOP holder 802 and/or the TXOP responder 804 are communication devices in suitable networks different from the WLANs 10.

The frame exchange 800 is generally the same as the frame exchange 700 of FIG. 7. FIG. 8 illustrates an embodiment in which a granular duration indication is used to indicate duration in a PHY preamble of a data unit. In particular, dashed arrows 710a, 714a, 720a, 721a, and 724a in FIG. 8 illustrate duration indicated in respective PHY preamble of the data units 708, 712, 716, 718, 722 and 728, respectively, using a range of possible durations with a certain granularity, as discussed above with respect to FIG. 5, for example, and the corresponding solid arrows 710b, 714b, 720b, 721b, and 724b illustrate the corresponding actual expected durations as indicated in MAC headers of the corresponding data units. In an embodiment, a communication device that transmits a data unit (e.g., the data unit 708, 712, 716, 718, 722 or 728), sets the duration indication (e.g., in the duration subfield 402-4) included in a PHY preamble of the data unit to an available value that exceeds the expected duration remaining in the TXOP and is closest to the actual duration remaining in the TXOP, wherein the available value is determined by the granularity being used to indicate the duration. In another embodiment, a communication device that transmits a data unit (e.g., the data unit 708, 712, 716, 718, 722 or 728), sets the duration indication (e.g., in the duration subfield 402-4) included in a PHY preamble of the data unit to an available value that exceeds an expected duration of time needed to transmit one or more data units (one or more data unit/ACK exchanges) that are to follow transmission of the data unit in the TXOP but does not exceed the expected duration remaining in the TXOP, wherein the available value is determined by the granularity being used to indicate the duration.

As illustrated in FIG. 8, the duration indicated in a particular data unit (dashed arrow) is relatively longer as compared to the corresponding actual expected duration, in at least some situations, in an embodiment. In an embodiment, a communication device that transmits a data unit (e.g., (e.g., the data unit 708, 712, 716, 718, 722 or 728) sets the duration indication (e.g., in the duration subfield 402-4) included in a PHY preamble of the data unit using a first granularity or a second granularity, where the first granularity is relatively smaller than the second granularity, as discussed above with respect to FIG. 5, for example. As discussed above, the communication device selects the first, relatively smaller, granularity for indicating the duration, if the duration is within a range that can be indicated by the first, relatively smaller, granularity, in an embodiment. Thus, the communication device selects the second, relatively larger, granularity for indicating the duration only if the duration is not within the range that can be indicated using the first, relatively smaller, granularity, in this embodiment. For example, in the embodiment of FIG. 8, the TXOP holder 802 selects the second, relatively larger granularity, for indicating the duration in the data unit 708 and in the data unit 716 because the duration to be indicated in each of the data unit 708 and the data unit 716 is outside of the range than can be indicated using the first granularity. Similarly, the TXOP responder 804 selects the second, relatively larger, granularity for indicating the duration in the data unit 712 because the duration to be indicated in the data unit 712 is outside of the range than can be indicated using the first granularity. On the other hand, the TXOP holder 802 selects the first, relatively smaller, granularity for indicating the duration in the data unit 722 because the duration (e.g., the remaining duration in the TXOP 806 after the data unit 722) is small enough to fall within the range that can be indicated using the first granularity. Similarly, the TXOP responder 804 selects the first, relatively smaller, granularity for indicating the duration in the data unit 718 because the duration (e.g., the remaining duration in the TXOP 806 after the data unit 718) is small enough to fall within the range that can be indicated using the first granularity. As illustrated in FIG. 8, the duration indicated in a PHY preamble of a data unit, e.g., the data unit 722 and 728 is very close (e.g., almost the same) as the expected duration indicated in a MAC header of the data unit, in at least some scenarios, because a relatively smaller granularity is used to indicated the duration in the PHY preamble of the data unit, in an embodiment. Thus, for example, arrows 724a and 724b are closer in respective lengths than arrows 720a and 720b, in the illustrated embodiment.

Figure 9:
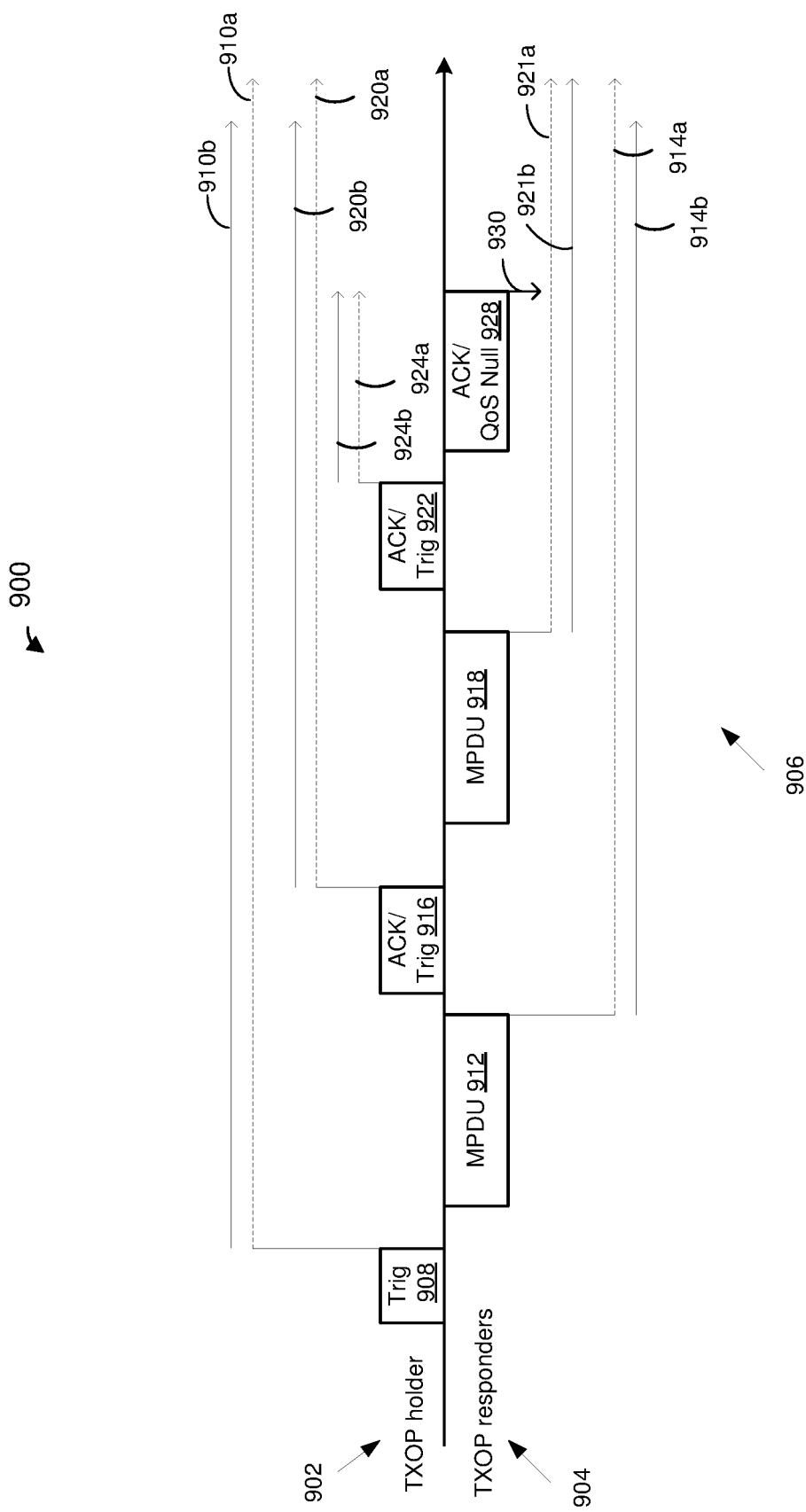
FIG. 9 is a diagram of another example frame exchange during a TXOP, according to an embodiment.

FIG. 9 is a diagram of a frame exchange 900 between a TXOP holder 902 and a plurality of TXOP responders 904 during a TXOP 906, according to an embodiment. In an embodiment, in the frame exchange 900, an AP (e.g., the AP 14-1) is the TXOP holder 902, and a plurality of client stations 25 (e.g., the client station 25-1 and the client station 25-2) are TXOP responders 904. In other embodiments, the TXOP holder 902 and the TXOP responders 904 are communication devices in suitable networks different from the WLANs 10. For ease of explanation, BSS identification and duration indication in various data units are explained with reference to the BSS color subfield 402-2 and the duration subfield 402-4 included in PHY preambles of the corresponding data units. However, BSS identification and duration indication included in a MAC header can be used instead of the corresponding indications in a PHY preamble of the data unit in at least some situations, as described above, for example, in some embodiments.

In the embodiment of FIG. 9, the plurality of TXOP responders 904 (e.g., a plurality of client stations 25) are triggered by the TXOP holder 902 for simultaneous uplink transmission to the TXOP holder 902. The TXOP holder 902 transmits a trigger data unit 908 to the plurality of TXOP responders 904 to trigger simultaneous transmission by the TXOP responders 904. The trigger data unit 908 is the same as or similar to the data unit 200 of FIG. 2, in an embodiment. The trigger data unit 908 includes the BSS color subfield 402-2 and the duration subfield 402-4 (FIG. 4) in a signal field of a PHY preamble of the trigger data unit 908, in an embodiment. The BSS color subfield 402-2 in the trigger data unit 908 is set to indicate a color of the BSS to which the TXOP holder 902 corresponds (e.g., the BSS with which the TXOP holder 702 is associated), in an embodiment. The duration subfield 402-4 in the trigger data unit 908 is set to indicate an expected remainder of the TXOP 906 after the end of the data unit 908, as indicated in FIG. 9 by an arrow 910a (indicated duration using a granular duration indication in a PHY preamble of the data unit 908) and an arrow 910b (actual, or a more accurate, expected duration indicated in a MAC header of the data unit 908), in an embodiment.

In response to receiving the trigger data unit 908, the TXOP responders 904 transmit respective uplink data units to the TXOP holder 902 as parts of an uplink multi-user data unit 912 to the TXOP holder 902. The uplink multi-user data unit 912 is an uplink OFDMA data unit and/or uplink MU-MIMO data unit, in an embodiment. The uplink multi-user data unit 912 includes independent data streams respectively transmitted by the TXOP responders 904 using respective OFDM sub-channels and/or respective spatial streams allocated for simultaneous uplink transmission by the TXOP responders 904, in an embodiment. In an embodiment, respective allocations of the OFDM sub-channels and/or the spatial streams are indicated to the TXOP responders 904 in the trigger data unit 908. In this embodiment, the independent data streams in the data unit 912 are transmitted by the TXOP responders 904 using respective OFDM sub-channels and/or respective spatial streams indicated to the TXOP responders 904 in the trigger data unit 908.

The uplink multi-user data unit 912 includes the BSS color subfield 402-2 and the duration subfield 402-4 (FIG. 4) in a signal field of a PHY preamble of the data unit 912, in an embodiment. The BSS color subfield 402-2 in the data unit 912 is set to indicate a color of the BSS to which the TXOP holder 912 corresponds (e.g., the BSS with which the TXOP holder 902 is associated), in an embodiment. The duration subfield 402-4 in the data unit 912 is set to indicate an expected remainder of the TXOP 906 after the end of the data unit 912, as indicated in FIG. 9 by an arrow 914a (indicated duration using a granular duration indication in a PHY preamble of the data unit 912) and an arrow 914b (actual, or more accurate, expected duration indicated in a MAC header of the data unit 912), in an embodiment. In an embodiment, each of the TXOP responders 904 determines the expected remaining duration based on a duration indication included in a MAC header (e.g., in the Duration/ID field 306 of the MAC header) of the data unit 908, and sets the duration indication in the duration subfield 402-4 in the PHY preamble of its respective data unit transmitted as part of the multi-user data 912 according to the expected remaining duration determined based on the duration indication included in the MAC header of the data unit 908. In another embodiment, each of at least some of the TXOP responders 904 determines the expected remaining duration based on a duration indication included in a PHY header (e.g., in the Duration field 404-4 of the PHY header) of the data unit 908, and sets the duration indication in the duration subfield 402-4 in the PHY preamble of its respective data unit transmitted as part of the multi-user data 912 according to the expected remaining duration determined based on the duration indication included in the PHY header of the data unit 908. In an embodiment, each of the TXOP responders 904 additionally sets a duration indication in a MAC (e.g., in the Duration/ID field 306 of the MAC header) of its respective data unit transmitted as part of the multi-user data 912 according to the expected remaining duration determined based on the duration indication included in the MAC header of the data unit 908.

After receiving the data unit 912, the TXOP holder 902 transmits an ACK/Trigger data unit 916 to the plurality of TXOP responders 904. The ACK/Trigger data unit 916 includes acknowledgements for the data units received by the TXOP holder 902 from the TXOP responders 904 as parts of the data unit 912. The ACK/Trigger data unit 916 additionally includes trigger information to trigger simultaneous transmission of respective additional data units by the TXOP responders 904. The ACK/Trigger data unit 916 includes the BSS color subfield 402-2 and the duration subfield 402-4 (FIG. 4) in a signal field of a PHY preamble of the data unit 916, in an embodiment. The BSS color subfield 402-2 in the ACK/Trigger data unit 916 is set to indicate a color of the BSS to which the TXOP holder 916 corresponds (e.g., the BSS with which the TXOP holder 902 is associated), in an embodiment. The duration subfield 402-4 in the ACK/Trigger data unit 916 is set to indicate an expected remainder of the TXOP 906 after the end of the ACK/Trigger data unit 916, as indicated in FIG. 9 by an arrow 920a (indicated duration using a granular duration indication in a PHY preamble of the data unit 916) and an arrow 920b (actual, or more accurate, expected duration indicated in a MAC header of the data unit 916), in an embodiment.

In response to receiving the trigger information in the ACK/Trigger data unit 916, the TXOP responders 904 transmit respective data units to the TXOP holder 902 as parts of an uplink multi-user data unit 918 to the TXOP holder 902. The uplink multi-user data unit 918 is an uplink OFDMA data unit and/or MU-MIMO data unit, in an embodiment. The uplink multi-user data unit 918 includes independent data streams respectively transmitted by the TXOP responders 904 using different OFDM sub-channels and/or different spatial streams allocated for simultaneous uplink transmissions by the TXOP responders 904, in an embodiment. In an embodiment, the independent data streams in the data unit 918 are transmitted by the TXOP responders 904 using respective OFDM sub-channels and/or respective spatial streams indicated to the TXOP responders 904 by the trigger information in the data unit 916.

The uplink multi-user data unit 918 includes the BSS color subfield 402-2 and the duration subfield 402-4 (FIG. 4)

in a signal field of a PHY preamble of the data unit 918, in an embodiment. The BSS color subfield 402-2 in the data unit 918 is set to indicate a color of the BSS to which the TXOP holder 902 corresponds (e.g., the BSS with which the TXOP holder 902 is associated), in an embodiment. The duration subfield 402-4 in the data unit 918 is set to indicate an expected remainder of the TXOP 906 after the end of the data unit 918, as indicated in FIG. 9 by an arrow 921a (indicated duration using a granular duration indication in a PHY preamble of the data unit 918) and an arrow 921b (actual, or more accurate, expected duration indicated in a MAC header of the data unit 918), in an embodiment. In an embodiment, each of the TXOP responders 904 determines the expected remaining duration based on a duration indication included in a MAC header (e.g., in the Duration/ID field 306 of the MAC header) of the data unit 916, and sets the duration indication in the duration subfield 402-4 in the PHY preamble of its respective data unit transmitted as part of the multi-user data 918 according to the expected remaining duration determined based on the duration indication included in the MAC header of the data unit 916. In another embodiment, each of at least some of the TXOP responders 904 determines the expected remaining duration based on a duration indication included in a PHY header (e.g., in the Duration field 404-4 of the PHY header) of the data unit 916, and sets the duration indication in the duration subfield 402-4 in the PHY preamble of its respective data unit transmitted as part of the multi-user data 918 according to the expected remaining duration determined based on the duration indication included in the PHY header of the data unit 916. In an embodiment, each of the TXOP responders 904 additionally sets a duration indication in a MAC (e.g., in the Duration/ID field 306 of the MAC header) of its respective data unit transmitted as part of the multi-user data 918 according to the expected remaining duration determined based on the duration indication included in the MAC header of the data unit 916.

After receiving the data unit 918, the TXOP holder 902 transmits an ACK/Trigger data unit 922 to the plurality of TXOP responders 904. The data unit 922 includes acknowledgements for the data units received by the TXOP holder 902 from the TXOP responders 904 as parts of the data unit 912. The data unit 916 additionally includes trigger information to trigger simultaneous transmission of quality of service (QoS) Null frames by the TXOP responders 904.

The ACK/Trigger data unit 922 includes the BSS color subfield 402-2 and the duration subfield 402-4 (FIG. 4) in a signal field of a PHY preamble of the ACK/Trigger data unit 922, in an embodiment. The BSS color subfield 402-2 in the ACK/Trigger data unit 922 is set to indicate a color of the BSS to which the TXOP holder 902 corresponds (e.g., the BSS with which the TXOP holder 902 is associated), in an embodiment. The ACK/Trigger data unit 922 is the last data unit to be transmitted by the TXOP holder 902 in the TXOP 906, in an embodiment. However, time required for transmitting the ACK/Trigger data unit 922 and the QoS Null frames triggered by the ACK/Trigger data unit 922 is less than the previously expected remaining duration of the TXOP 906. In an embodiment, the duration subfield 402-4 is set to indicate a time, after the end of the ACK/Trigger data unit 922, needed to transmit a QoS Null data unit that is expected to follow reception of the ACK/Trigger data unit 922, as indicated in FIG. 9 by an arrow 924a (indicated duration using a granular duration indication in a PHY preamble of the data unit 924) and an arrow 924b (actual, or more accurate, expected duration indicated in a MAC header of the data unit 924), in an embodiment.

In response to receiving ACK/Trigger data unit 922, the TXOP responders 904 transmit respective data units to the TXOP holder 902 as parts of an uplink multi-user data unit 928 to the TXOP holder 902. The respective data units include acknowledgements that acknowledge receipt of the data unit 922 by the TXOP responders 904, in an embodiment. The respective data units additionally include QoS Null data frames triggered by the trigger information included in the data unit 922, in an embodiment.

The uplink multi-user data unit 928 includes the BSS color subfield 402-2 and the duration subfield 402-4 (FIG. 4) in a signal field of a PHY preamble of the data unit 918, in an embodiment. The BSS color subfield 402-2 in the data unit 928 is set to indicate a color of the BSS to which the TXOP holder 928 corresponds (e.g., the BSS with which the TXOP holder 902 is associated), in an embodiment. The uplink data unit 928 is the last data unit to be transmitted in the TXOP 906, in an embodiment. Accordingly, the duration subfield 402-4 in the data unit 928 is set to zero, as indicated in FIG. 9 by an arrow 930, in an embodiment.

Figure 10:
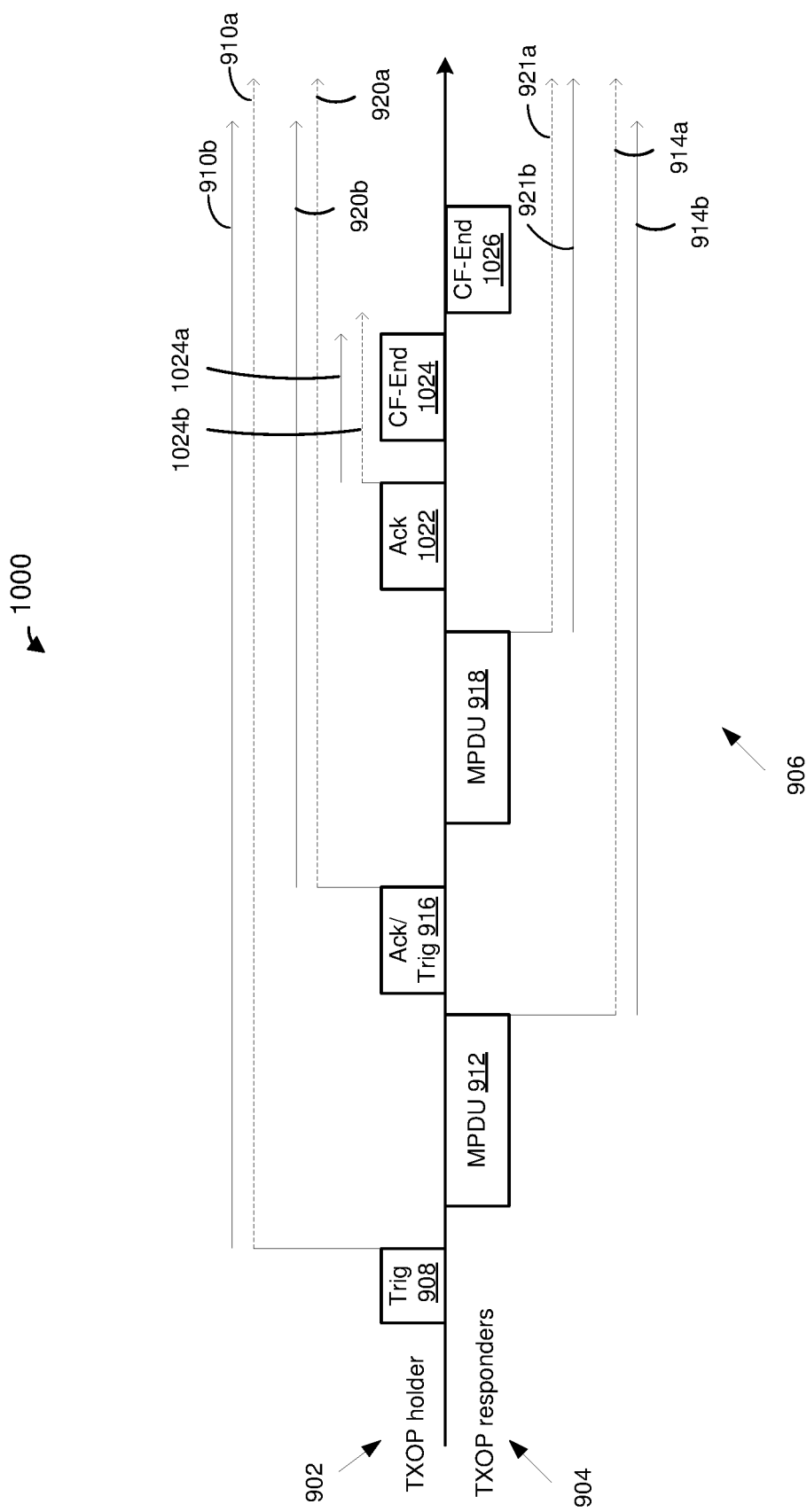
FIG. 10 is a diagram of another example frame exchange during a TXOP, according to an embodiment.

FIG. 10 is a diagram of a frame exchange 1000 between the TXOP holder 902 and the plurality of TXOP responders 904 during a TXOP 906, according to another embodiment. The frame exchange 1000 is generally the same as the frame exchange 900 of FIG. 9 except that in the frame exchange 1000, the TXOP holder 1002 does not trigger transmission of QoS Null frames by the TXOP responders 1004. Accordingly, ACK/Trigger data unit 922 in the frame exchange 900 is replaced with an ACK data unit 1022 in the frame exchange 1000. The ACK data unit 1022 includes acknowledgements for the data units received by the TXOP holder 902 from the TXOP responders 904 as parts of the data unit 918.

The ACK data unit 1022 includes the BSS color subfield 402-2 and the duration subfield 402-4 (FIG. 4) in a signal field of a PHY preamble of the ACK data unit 1022, in an embodiment. The BSS color subfield 402-2 in the ACK data unit 1022 is set to indicate a color of the BSS to which the TXOP holder 902 corresponds (e.g., the BSS with which the TXOP holder 902 is associated), in an embodiment. The TXOP holder 902 intends to terminate the TXOP 906 by transmitting a contention free end (CF-end) frame following transmission of the ACK data unit 1022, in an embodiment. However, time required for transmitting the CF-End frame data unit 922 following the ACK data unit 1022 is less than the previously expected remaining duration of the TXOP 906. In an embodiment, the duration subfield 402-4 of the ACK data unit 902 is set to indicate a time, after the end of the ACK data unit 922, needed to transmit a CF-end frame by the TXOP holder 902, as indicated in FIG. 10 by an arrow 1024a (indicated duration using granular duration indication) and an arrow 1024b (actual expected duration), in an embodiment.

After receiving the ACK data unit 1022, the TXOP holder 902 transmits a CF-End frame 1024. The CF-End frame 1024 indicates to communication device that can detect the CF-End frame that the TXOP 906 has been terminated, in an embodiment. In response to receiving the CF-End frame 1024, the TXOP responders 904 transmit respective simultaneous CF-End frames 1026. The CF-End frames 1026 indicate to communication devices that can detect the CF-End frames 1026 that the TXOP 906 has been terminated, in an embodiment.

In an embodiment, a communication device (e.g., an AP 14 or a client station 25) that receives a data unit, such as the data unit 200 of FIG. 2, detects an error based on decoding a data portion (e.g., the data portion 250 in FIG. 2) of the data unit. For example, the communication device detects an error based on a failed frame check sequence (FCS) in the data portion of the data unit, in an embodiment. However, in an embodiment, the communication device correctly decodes a signal field (e.g., the HE-SIG-A 220) in a PHY preamble of the data unit, where the signal field includes a duration indicator subfield (e.g., the duration subfield 402-4 of FIG. 4) that indicates a duration of time for which a communication medium is expected to be busy. The communication device sets a channel access counter (e.g., a NAV counter) based on the duration indication in the single field of the PHY preamble of the data unit. For example, the communication device sets the channel access counter according to rules (1)-(3) described above, in an embodiment. Thus, although the communication device was unable to correctly decode the data portion, the communication device was nonetheless able to properly set its channel access counter based on a duration indication included in the signal field of the PHY preamble of the data unit, in this embodiment. In an embodiment, in this case, the communication device is not required to use an extended interframe space, such as an extended interframe space (EIFS) defined by the first communication protocol, for sensing the commutation medium in a backoff procedure performed by the communication device when the channel access counter reaches zero. Accordingly, in an embodiment, in the case that the communication device correctly decodes the signal field of the PHY preamble of the data unit, the communication device uses a non-extended interframe space, such as a distributed coordination function (DCF) interframe space (DIFS), in the backoff procedure even if the communication device could not correctly decode the data portion of the data unit, in an embodiment.

Figure 11:
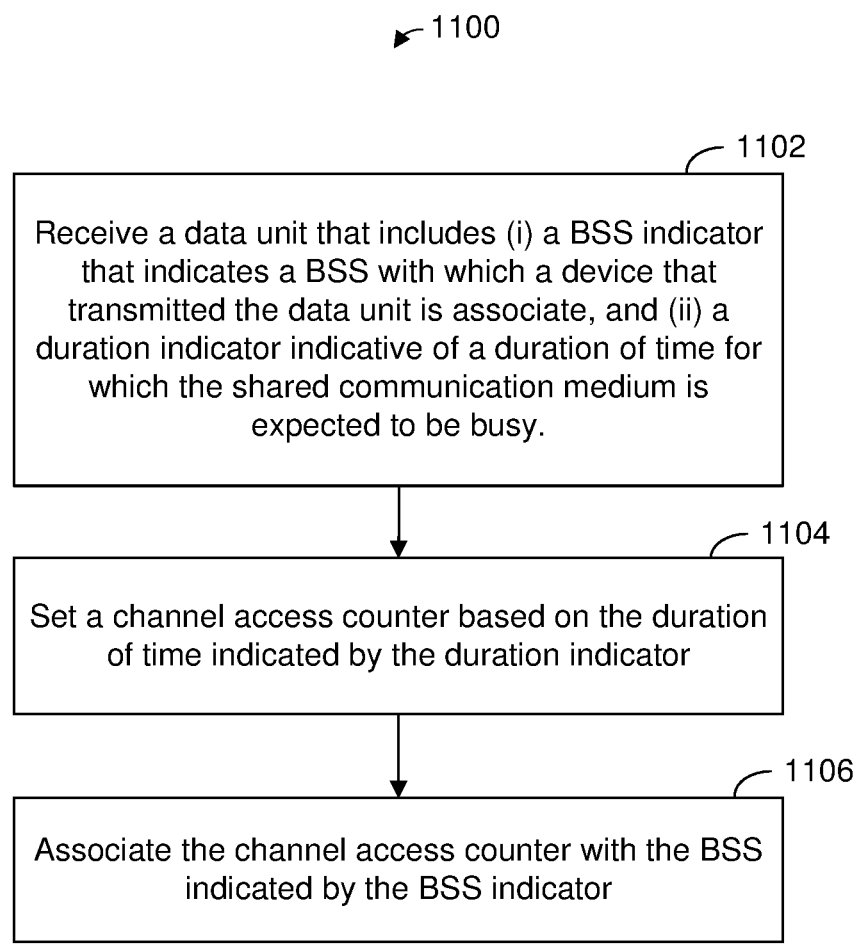
FIG. 11 is a flow diagram of an example method for protecting transmissions in a shared communication medium, according an embodiment.

FIG. 11 is a flow diagram of an example method 1100 for protecting transmissions in a shared communication medium, according an embodiment. In an embodiment, the method 1100 is implemented by an AP (e.g., an AP 14 of FIG. 1). In another embodiment, the method 1100 is implemented by a client station (e.g., a client station 2 of FIG. 1). In still another embodiment, the method 1100 is implemented by both an AP (e.g., an AP 14) and a client station (e.g., a client station 25). For example, in some embodiments, the network interface device 16 and/or 27 is configured to implement the method 1100. As another example, in some embodiments, the host processor 15 is configured to implement at least a portion of the method 1100. As another example, in some embodiments, the host processor 15 and/or 26 and the network interface device 16 and/or 27 are configured to implement the method 1100. As yet another example, in some embodiments, the MAC processors 18 and/or 28 is configured to implement portions of the method 1100, and the PHY processors 20 and/or 29 are configured to implement other portions of the method 1100. In other embodiments, another suitable communication device is configured to implement the method 1100.

At block 1101, a data unit is received. In an embodiment, the data unit 200 is received. In another embodiment, a suitable data unit different from the data unit 200 is received. The data unit includes a BSS indicator that indicates to which the data unit corresponds (e.g., a BSS with which the device that transmitted the data unit is associated). The data unit also includes a duration indicator that indicates a duration of time for which the shared medium is expected to be busy. The BSS indicator and the duration indicator are included in a PHY preamble of the data unit, in an embodiment. For example, the BSS indicator and the duration indicator are included in a signal field (e.g., the HE-SIGA 222) of the PHY preamble of the data unit. As an example, in an embodiment, the data unit includes, in the signal field of the PHY preamble of the data unit, (i) the BSS color subfield 402-2 and (ii) the duration subfield 402-4 in a signal field (e.g., the HE-SIGA 222) of the PHY preamble of the data unit, where the BSS color field is set to indicate a BSS color of the BSS to which the data unit corresponds, and the duration subfield 402-4 is set to indicate the duration of time for which the shared medium is expected to be busy. For example, the duration subfield 402-4 is set to indicate a duration of time corresponding to an expected remainder of a TXOP, in which the data unit is being transmitted, after the end of the data unit, in an embodiment. In another embodiment, the duration indication and/or the BSS indication is included in a MAC header of the data unit.

At block 1104, a channel access counter is set (or reset) based on the duration of time indicated by the duration indicator in the PHY preamble of the data unit received at block 1102. In an embodiment, the channel access counter set (or reset) based on the duration of time indicated by the duration indicator in the PHY preamble of the data unit is a NAV counter. In other embodiment, the channel access counter set (or reset) based on the duration of time indicated by the duration indicator in the PHY preamble of the data unit is a suitable counter other than a NAV counter. At block 1106, the channel access counter is associated with the BSS indicated by the BSS indicator in the data unit. For example, a value of the BSS indicator in the unit is recorded as an association between the channel access counter and the BSS indicated by the BSS indicator in the data unit, in an embodiment.

In an embodiment, the channel access counter is (i) set (or reset) at block 1104 and (ii) associated with the BSS at block 1106 according to rules (1)-(3) described above. For example, in an embodiment, the channel access counter is (i) set (or reset) at block 1104 and (ii) associated with the BSS at block 1106 using the technique 600 of FIG. 6. In another embodiment, the channel access counter is (i) set (or reset) at block 1104 and (ii) associated with the BSS at block 1106 according to a suitable set of rules different from rules (1)-(3) and/or using a suitable technique different from the technique 600 of FIG. 6.

At least some of the various blocks, operations, and techniques described above may be implemented utilizing hardware, a processor executing firmware instructions, a processor executing software instructions, or any combination thereof. Examples of suitable hardware include a microprocessor, microcontroller, one or more integrated circuits, one or more application specific integrated circuits (ASICs), one or more field programmable gate arrays, one or more programmable logic devices, etc. When implemented utilizing a processor executing software or firmware instructions, the software or firmware instructions may be stored on a computer readable medium, or media, such as a magnetic disk, an optical disk, a random access memory (RAM), a read only memory (ROM), a flash memory, a magnetic tape, etc. The software or firmware instructions may include machine readable instructions that, when executed by one or more processors, cause the one or more processors to perform various acts.

When implemented in hardware, the hardware may comprise one or more of i) discrete components, ii) one or more integrated circuits, iii) one or more ASICs, iv) one or more programmable logic devices, etc.

While the present disclosure has been described with reference to specific examples, which are intended to be illustrative only and not to be limiting of the invention, changes, additions and/or deletions may be made to the disclosed embodiments without departing from the scope of the claims.

What is claimed is:

1. A method for generating a physical layer (PHY) data unit for transmission in a shared communication medium during a transmit opportunity (TXOP), the method comprising:
   generating, at a wireless communication device, a TXOP field to be included in the PHY data unit, the TXOP field generated to indicate a length of time remaining in the TXOP;
   generating, at the wireless communication device, a PHY preamble of the PHY data unit, the PHY preamble generated to include i) a legacy signal field in a legacy portion of the PHY preamble and ii) a non-legacy signal field in a non-legacy portion of the PHY preamble, wherein generating the PHY preamble includes generating the non-legacy signal field to include the TXOP field;
   generating, at the wireless communication device, the PHY data unit to include the PHY preamble and a data portion; and
   transmitting, by the wireless communication device, the PHY data unit in the shared communication medium;
   wherein generating the TXOP field includes,
      setting a first set of bits of the TXOP field to indicate a TXOP length granularity, and
      setting a second set of bits of the TXOP field to indicate the length of time remaining in the TXOP scaled by the TXOP length granularity;
   wherein setting the first set of one or more bits of the TXOP field to indicate the TXOP length granularity includes,
      setting the first set of one or more bits of the TXOP field to indicate a first TXOP length granularity when the TXOP length does not exceed a threshold TXOP length value, and
      setting the first set of one or more bits of the TXOP field to indicate a second TXOP length granularity, different from the first TXOP length granularity, when the TXOP length exceeds the threshold TXOP length value.

2. The method of claim 1,
   wherein setting the first set of one or more bits of the TXOP field to indicate the TXOP length granularity comprises setting a single bit of the TXOP field to indicate one of two predetermined TXOP length granularities.

3. The method of claim 1, further comprising generating a basic service set (BSS) color field to include an identifier of a BSS with which the wireless communication device is associated, wherein generating the non-legacy signal field comprises generating the non-legacy signal field to further include the BSS color field.

4. A wireless communication device, comprising:
   a wireless network interface device implemented on one or more integrated circuits (ICs), wherein the wireless network interface device is configured to:
   generate a transmit opportunity (TXOP) field to be included in a PHY data unit for transmission in a shared communication medium during a TXOP of the wireless communication device, the TXOP field generated to indicate a length of time remaining in the TXOP,
   generate a PHY preamble of the PHY data unit, the PHY preamble generated to include i) a legacy signal field in a legacy portion of the PHY preamble and ii) a non-legacy signal field in a non-legacy portion of the PHY preamble, the wireless network interface device being configured to generate the non-legacy signal field to include the TXOP field,
   generate the PHY data unit to include the PHY preamble and a data portion, and
   transmit the PHY data unit in the shared communication medium;
   wherein the wireless network interface device is configured to,
      set a first set of bits of the TXOP field to indicate a TXOP length granularity, and
      set a second set of bits of the TXOP field to indicate the length of time remaining in the TXOP scaled by the TXOP length granularity;
   wherein the wireless network interface device is configured to,
      set the first set of one or more bits of the TXOP field to indicate a first TXOP length granularity when the TXOP length does not exceed a threshold TXOP length value, and
      set the first set of one or more bits of the TXOP field to indicate a second TXOP length granularity, different from the first TXOP length granularity, when the TXOP length exceeds the threshold TXOP length value.

5. The wireless communication device of claim 4,
   wherein the wireless network interface device is configured to set a single bit of the TXOP field to indicate one of two predetermined TXOP length granularities.

6. The wireless communication device of claim 4, wherein the wireless network interface device is further configured to:
   generate a basic service set (BSS) color field to include an identifier of a BSS with which the wireless communication device is associated, and
   generate the non-legacy signal field to further include the BSS color field.

7. A method for operating in a shared communication medium during a transmit opportunity (TXOP), the method comprising:
   receiving, at a wireless communication device, a physical layer (PHY) data unit, including receiving a PHY preamble of the PHY data unit, wherein the PHY preamble includes i) a legacy signal field in a legacy portion of the PHY preamble and ii) a non-legacy signal field in a non-legacy portion of the PHY preamble, the non-legacy signal field including a TXOP field;
   processing, at the wireless communication device, the TXOP field to determine a length of time remaining in the TXOP;
   setting, at the wireless communication device, a channel access counter based on the length of time remaining in the TXOP determined based on the TXOP field in the non-legacy signal field in the non-legacy portion of the PHY preamble of the PHY data unit; and
   performing, at the wireless communication device, a channel access procedure using the channel access counter set based on the length of time remaining in the TXOP to defer transmission, by the wireless communication device, in the shared communication medium for at least the length of time remaining in the TXOP;
   wherein processing the TXOP field includes,
      processing a first set of bits of the TXOP field to determine a TXOP length granularity, and processing a second set of bits of the TXOP field to determine the length of time remaining in the TXOP scaled by the TXOP length granularity;

wherein processing the first set of one or more bits comprises, processing the first set of one or more bits to identify a first TXOP length granularity when the TXOP length does not exceed a threshold TXOP length value, and processing the first set of one or more bits to identify a second TXOP length granularity, different from the first TXOP length granularity, when the TXOP length exceeds the threshold TXOP length value.

8. The method of claim 7, wherein processing the first set of one or more bits of the TXOP field comprises processing a single bit of the TXOP field to identify one of two predetermined TXOP length granularities.

9. The method of claim 7, further comprising:

detecting, at the wireless communication device, an error based on decoding a data portion of the PHY data unit, counting down the channel access counter set based on the length of time indicated in the TXOP field in the non-legacy signal field in the non-legacy portion of the PHY preamble of the PHY data unit, and when the channel access counter reaches zero, performing a backoff procedure to determine when the shared communication medium is idle, the backoff procedure being performed using a non-extended interframe space and without evoking an extended interframe space (EIFS).

10. A wireless communication device, comprising:

a wireless network interface device implemented on one or more integrated circuits (ICs), wherein the wireless network interface device is configured to:

receive a physical layer (PHY) data unit, including receiving a PHY preamble of the PHY data unit, wherein the PHY preamble includes i) a legacy signal field in a legacy portion of the PHY preamble and ii) a non-legacy signal field in a non-legacy portion of the PHY preamble, the non-legacy signal field including a TXOP field, process the TXOP field to determine a length of time remaining in the TXOP, set a channel access counter based on the determined length of time remaining in the TXOP determined based on the TXOP field in the non-legacy signal field in the non-legacy portion of the PHY preamble of the PHY data unit, and perform a channel access procedure using the channel access counter set based on the length of time remaining in the TXOP to defer transmission, by the wireless communication device, in the shared communication medium for at least the length of time remaining in the TXOP;

wherein the wireless network interface device is configured to, process a first set of bits of the TXOP field to determine a TXOP length granularity, and process a second set of bits of the TXOP field to determine the length of time remaining in the TXOP scaled by the TXOP length granularity;

wherein the wireless network interface device is configured to:

process the first set of one or more bits to identify a first TXOP length granularity when the TXOP length does not exceed a threshold TXOP length value, and process the first set of one or more bits to identify a second TXOP length granularity, different from the first TXOP length granularity, when the TXOP length exceeds the threshold TXOP length value.

11. The wireless communication device of claim 10, wherein the wireless network interface device is configured to process a single bit of the TXOP field to identify one of two predetermined TXOP length granularities.

12. The wireless communication device of claim 10, wherein the wireless network interface device is configured to:

detect an error based on decoding a data portion of the PHY data unit, count down the channel access counter set based on the length of time indicated in the TXOP field in the non-legacy signal field in the non-legacy portion of the PHY preamble of the PHY data unit, and when the channel access counter reaches zero, perform a backoff procedure to determine when the shared communication medium is idle, the backoff procedure being performed using a non-extended interframe space and without evoking an extended interframe space (EIFS).

13. The method of claim 1:

wherein the TXOP length granularity indicates a granularity used in the length of time remaining in the TXOP, and the length of time remaining in the TXOP is an unscaled duration indication that indicates a duration within a set of possible duration values that can be indicated by the second set of bits and with the granularity indicated by the TXOP length granularity.

14. The wireless communication device claim 4:

wherein the TXOP length granularity indicates a granularity used in the length of time remaining in the TXOP, and the length of time remaining in the TXOP is an unscaled duration indication that indicates a duration within a set of possible duration values that can be indicated by the second set of bits and with the granularity indicated by the TXOP length granularity.

15. The method of claim 7:

wherein the TXOP length granularity indicates a granularity used in the length of time remaining in the TXOP, and the length of time remaining in the TXOP is an unscaled duration indication that indicates a duration within a set of possible duration values that can be indicated by the second set of bits and with the granularity indicated by the TXOP length granularity.

16. The wireless communication device of claim 10:

wherein the TXOP length granularity indicates a granularity used in the length of time remaining in the TXOP, and the length of time remaining in the TXOP is an unscaled duration indication that indicates a duration within a set of possible duration values that can be indicated by the second set of bits and with the granularity indicated by the TXOP length granularity.

* * * * *